US007489848B2

(12) United States Patent
Kim et al.

(10) Patent No.: US 7,489,848 B2
(45) Date of Patent: *Feb. 10, 2009

(54) OPTICAL FIBER WITH A CORE RING

(75) Inventors: Hyang Kyun Kim, Sunnyvale, CA (US); Shanhui Fan, Stanford, CA (US); Gordon S. Kino, Stanford, CA (US); Jonghwa Shin, Stanford, CA (US); Michel J. F. Digonnet, Palo Alto, CA (US); Vinayak Dangui, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/971,181

(22) Filed: Jan. 8, 2008

(65) Prior Publication Data

US 2008/0112678 A1 May 15, 2008

Related U.S. Application Data

(63) Continuation of application No. 11/737,683, filed on Apr. 19, 2007, now Pat. No. 7,400,806, which is a continuation of application No. 11/123,879, filed on May 6, 2005, now Pat. No. 7,228,041, which is a continuation-in-part of application No. 10/938,755, filed on Sep. 10, 2004, now Pat. No. 7,110,650.

(60) Provisional application No. 60/569,271, filed on May 8, 2004, provisional application No. 60/564,896, filed on Apr. 23, 2004, provisional application No. 60/502,531, filed on Sep. 12, 2003, provisional application No. 60/502,390, filed on Sep. 12, 2003, provisional application No. 60/502,329, filed on Sep. 12, 2003.

(51) Int. Cl.
*G02B 6/032* (2006.01)
*G02B 6/02* (2006.01)

(52) U.S. Cl. .................................... 385/125; 385/123
(58) Field of Classification Search .......... 385/123–128
See application file for complete search history.

(56) References Cited

U.S. PATENT DOCUMENTS 4,826,434 A 5/1989 Krueger (Continued)

FOREIGN PATENT DOCUMENTS

| WO | WO 99/64903 A1 | 12/1999 |
|---|---|---|
| WO | WO 02/14946 A1 | 2/2002 |
| WO | PCT/US02/18045 | 9/2004 |
| WO | WO 2005/026783 | 3/2005 |
| WO | PCT/US2005/016004 | 5/2005 |

OTHER PUBLICATIONS

Allan, Douglas C., et al., Surface modes and loss in air-core photonic band-gap fibers, in Photonic Crystals Materials and Devices, A. Adibi et al. (eds.), *Proceedings of SPIE*, vol. 5000, 2003, pp. 161-174.

(Continued)

*Primary Examiner*—Kevin S Wood
(74) *Attorney, Agent, or Firm*—Knobbe, Martens, Olson & Bear, LLP

(57) ABSTRACT

An optical fiber includes a cladding with a material having a first refractive index and a pattern of regions formed therein. Each of the regions has a second refractive index lower than the first refractive index. The optical fiber further includes a core region and a core ring surrounding the core region and having an inner perimeter, an outer perimeter, and a thickness between the inner perimeter and the outer perimeter. The thickness is sized to reduce the number of ring surface modes supported by the core ring.

24 Claims, 29 Drawing Sheets

U.S. PATENT DOCUMENTS

| | | | |
|---|---|---|---|
| 5,310,343 | A | 5/1994 | Hasegawa et al. |
| 5,802,236 | A | 9/1998 | Digiovanni et al. |
| 6,174,167 | B1 | 1/2001 | Wohrle |
| 6,243,522 | B1 | 6/2001 | Allan et al. |
| 6,260,388 | B1 | 7/2001 | Borrelli et al. |
| 6,334,017 | B1 | 12/2001 | West |
| 6,334,019 | B1 | 12/2001 | Birks et al. |
| 6,778,749 | B2 | 8/2004 | Allan et al. |
| 6,917,741 | B2 | 7/2005 | Fekety et al. |
| 7,110,650 | B2 * | 9/2006 | Kim et al. ............... 385/125 |
| 7,228,041 | B2 * | 6/2007 | Kim et al. ............... 385/125 |
| 2002/0136516 | A1 | 9/2002 | Allan et al. |
| 2004/0105645 | A1 | 6/2004 | Allan et al. |
| 2005/0118420 | A1 | 6/2005 | Kim et al. |

OTHER PUBLICATIONS

Benabid, F., et al., Particle levitation and guidance in hollow-core photonic crystal fiber, *Optics Express*, vol. 10, No. 21, Oct. 21, 2002, pp. 1195-1203.

Blazephotonics, *HC—1550—02 Hollow Core Photonic Bandgap Fiber*, 4 pages.

Bouwmans, G., et al., Properties of a hollow-core photonic bandgap fiber at 850 nm wavelength, *Optics Express*, Jul. 14, 2003, vol. 11, No. 14, pp. 1613-1620.

Broeng, Jes, et al., Photonic Crystal Fibers: A New Class of Optical Waveguides, *Optical Fiber Technology*, vol. 5, 1999, pp. 305-330.

Broeng, Jes et al., Analysis of air guiding photonic bandgap fibers, *Optics Letters*, vol. 25, No. 2, Jan. 15, 2000, pp. 96-98.

Cregan, R.F., et al., Single-Mode Photonic Band Gap Guidance of Light in Air, *Science*, vol. 285, Sep. 3, 1999, pp. 1537-1539.

Digonnet, Michel J.F. et al., Simple geometric criterion to predict the existence of surface modes in air-core photonic-bandgap fibers, *Optics Express*, vol. 12, No. 9, May 3, 2004, pp. 1864-1872.

Ferrarini, D., et al., Leakage properties of photonic crystal fibers, *Optics Express*, vol. 10, No. 23, Nov. 18, 2002, pp. 1314-1319.

Hansen, T.P., et al., Air-guidance over 345m large-core photonic bandgap fiber, *Optical Fiber Communication Conference OFC'03*, Deadline paper (Atlanta, Georgia, Mar. 2003), 3 pages.

Hansen, Theis P., et al., Air-Guiding Photonic Bandgap Fibers: Spectral Properties, Macrobending Loss, and Practical Handling, *Journal of Lightwave Technology*, vol. 22, No. 1, Jan. 2004, pp. 11-15.

Joannopoulos, J.D., et al., *Photonic Crystals: Molding the flow of light*, Princeton University Press, Princeton, New Jersey, 1995, pp. 54-77.

Johnson, Steven G., et al., Block-iterative frequency-domain methods for Maxwell's equations in a planewave basis, *Optic Express*, vol. 8, No. 3, Jan. 29, 2001, pp. 173-190.

Kaiser, P., et al., Low-loss single material fibers made from pure fused silica, *The Bell System Technical Journal*, vol. 53, No. 6, Jul.-Aug. 1974, pp. 1021-1039.

Kim, H.K., et al., Designing air-core photonic-bandgap fibers free of surface modes, *IEEE Journal of Quantum Electronics*, vol. 40, No. 5, May 2004, pp. 551-556.

Knight, J.C., et al., All-silica single mode optical fiber with photonic crystal cladding, *Optics Letters*, vol. 21, No. 19, Oct. 1, 1996, pp. 1547-1549.

Knight, Jonathan C., Photonic crystal fibres, *Nature*, vol. 424, No. 6950, Aug. 14, 2003, pp. 847-851.

Kuhlmey, B., et al., Chromatic dispersion and losses of microstructured optical fibers, *Applied Optics*, vol. 42, No. 4, Feb. 1, 2003, pp. 634-639.

Lau, Wah Tung, et al., Creating large bandwidth line defects by embedding dielectric waveguides into photonic crystal slabs, *Applied Physics Letters*, vol. 81, No. 21, Nov. 18, 2002, pp. 3915-3917.

Mangan, B.J., et al., Low loss (1.7 dB/km) hollow core photonic bandgap fiber, *Conference on Optical Fiber Communication OFC 2004*, Post Deadline paper PDP24, Los Angeles, California, Feb. 22-27, 2004, 3 pages.

Mortensen, Niels Asger, Effective area of photonic crystal fibers, *Optics Express*, vol. 10, No. 7, Apr. 8, 2002, pp. 341-348.

Müller, Dirk, et al., Measurement of Photonic Band-gap Fiber Transmission from 1.0 to 3.0 µm and Impact of Surface Mode Coupling, *Proceedings of Conference on Laser and Electro-Optics (CLEO) 2003*, Baltimore, USA, Jun. 1-6, 2003, paper QTuL2, 2 pages.

Ouzonov, Dimitri G., et al., Dispersion and nonlinear propagation in air-core photonic band-gap fibers, *Proceedings of Conference on Laser and Electro-Optics (CLEO) 2003*, Baltimore, USA, Jun. 1-6, 2003, paper CThV5, 2 pages.

Pottage, J.M., et al., Robust photonic band gaps for hollow core guidance in PCF made from high index glass, *Optics Express*, vol. 11, No. 22, Nov. 3, 2003, pp. 2854-2861.

Qiu, M., Analysis of guided modes in photonic crystal fibers using the finite-difference time-domain method, *Microwave Optical Technology Letters*, vol. 30, No. 5, Sep. 5, 2001, pp. 327-330.

Ramos-Mendieta, F., et al., Surface electromagnetic waves in two-dimensional photonic crystals: effect of the position of the surface plane, *Physical Review B*, vol. 59, No. 23, Jun. 15, 1999, pp. 15112-15120.

Renn, M.J., et al., Laser-Guided Atoms in Hollow-Core Optical Fibers, *Physical Review Letters*, vol. 75, No. 18, Oct. 30, 1995, pp. 3253-3256.

Renversez, G., et al., Dispersion management with microstructured optical fibers: ultraflattened chromatic dispersion with low losses, *Optics Letters*, vol. 28, No. 12, Jun. 15, 2003, pp. 989-991.

Russell, Philip, Photonic Crystal Fibers, *Science*, vol. 299, Jan. 17, 2003, pp. 358-362.

Saitoh, K., et al., Full-vectorial imaginary-distance beam propagation method based on finite element scheme: Application to photonic crystal fibers, *IEEE Journal of Quantum Electronics*, vol. 38, No. 7, Jul. 2002, pp. 927-933.

Saitoh, K., et al., Chromatic dispersion control in photonic crystal fibers: application to ultra-flattened dispersion, *Optics Express*, vol. 11, No. 8, Apr. 21, 2003, pp. 843-852.

Saitoh, K., et al., Leakage loss and group velocity dispersion in air-core photonic bandgap fibers, *Optics Express*, vol. 11, No. 23, Nov. 17, 2003, pp. 3100-3109.

Saitoh, K., et al., Air-core photonic band-gap fibers: the impact of surface modes, *Optics Express*, vol. 12, No. 3, Feb. 9, 2004, pp. 394-400.

Smith, Charlene M., et al., Low-loss hollow-core silica/air photonic bandgap fibre, *Nature*, vol. 424, No. 6949, Aug. 7, 2003, pp. 657-659.

Suzuki, Kazunori, et al., Ultrabroad band white light generation from a multimode photonic bandgap fiber with an air core, *Proceedings of Conference on Laser and Electro-Optics (CLEO) 2001*, paper WIPD1-11, pp. 24-25.

Temelkuran, Burak, et al., Wavelength-scalable hollow optical fibres with large photonic bandgaps for $CO_2$ laser transmission, *Nature*, vol. 420, Dec. 12, 2002, pp. 650-653.

Venkataraman, N., et al., Low loss (13 dB/km) air core photonic band-gap fibre, *Proceedings of European Conference on Optical Communication*, ECOC 2002, Copenhagen, Denmark, PostDeadline Session 1, PostDeadline Paper PD1.1, Sep. 12, 2002.

West, J.A., et al., Photonic Crystal Fibers, *Proceedings of 27th European Conference on Optical Communications (ECOC'01—Amsterdam)*, Amsterdam, The Netherlands, Sep. 30-Oct. 4, 2001 paper ThA2.2, pp. 582-585.

West, J.A., et al., Surface modes in air-core photonic band-gap fibers, *Optics Express*, vol. 12, No. 8, Apr. 19, 2004, pp. 1485-1496.

White, T.P., et al., Confinement losses in microstructured optical fibers, *Optics Letters*, vol. 26, No. 21, Nov. 1, 2001, pp. 1660-1662.

Windeler, R.S., et al., Silica-air microstructured fibers: Properties and applications, *Optical Fiber Communications Conference*, San Diego, 1999, pp. FG1-1 and FG1-2.

Xu, Y., et al., Asymptotic analysis of Bragg fibers, *Optics Letters*, vol. 25, No. 24, Dec. 15, 2000, pp. 1756-1758.

Yariv, A., et al., *Optical Waves in Crystals: Propagation and Control of Laser Radiation*, John Wiley & Sons, New York, 1984, pp. 209-214.

Yeh, Pochi, et al., Theory of Bragg Fiber, *Journal of Optical Society of America*, vol. 68, No. 9, Sep. 1978, pp. 1196-1201.

Zhi, W., et al., Supercell lattice method for photonic crystal fibers, *Optics Express*, vol. 11, No. 9, May 5, 2003, pp. 980-991.

\* cited by examiner

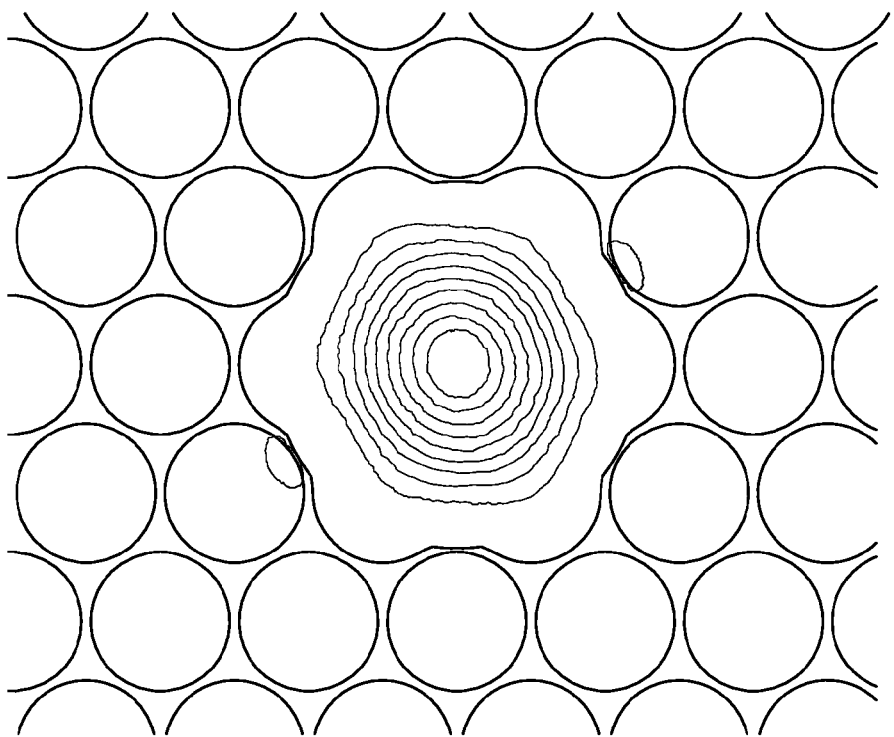
FIG. 4 Fundamental Core Mode
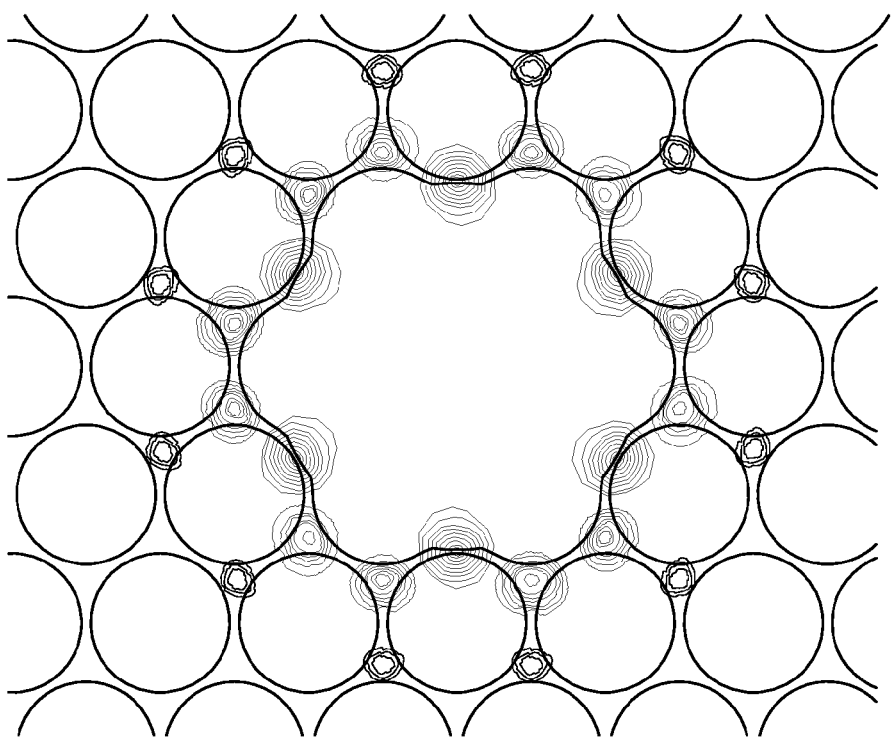
FIG. 3 Surface Modes

Bulk Mode

CORE RADIUS THAT DOES NOT SUPPORT SURFACE MODES

CORE RADIUS THAT SUPPORTS SURFACE MODES

Contour: 0.1 step from 0.1 to 0.9

0.1, 0.9, 0.1 step 0.1, 0.9, 0.1 step

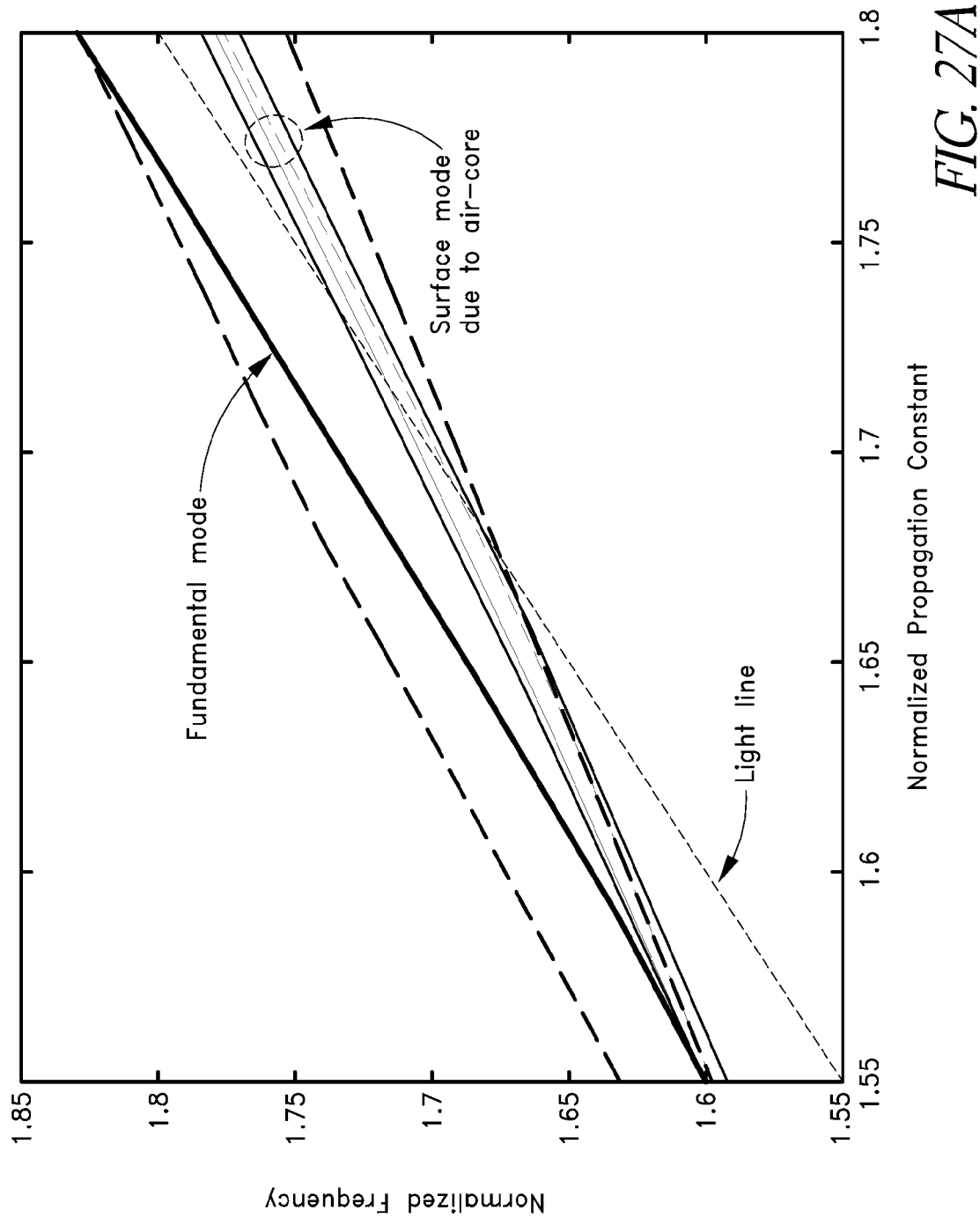

OPTICAL FIBER WITH A CORE RING

RELATED APPLICATIONS

The present application is a continuation of U.S. patent application Ser. No. 11/737,683, filed Apr. 19, 2007 (now U.S. Pat. No. 7,400,806, issued Jul. 15, 2008) and incorporated in its entirety by reference herein, which is a continuation of U.S. patent application Ser. No. 11/123,879, filed May 6, 2005 (now U.S. Pat. No. 7,228,041, issued Jun. 5, 2007) and incorporated in its entirety by reference herein, which is a continuation-in-part of U.S. patent application Ser. No. 10/938,755, filed Sep. 10, 2004 (now U.S. Pat. No. 7,110,650, issued on Sep. 19, 2006) and incorporated in its entirety by reference herein, and claims the benefit of priority under 35 U.S.C. § 119(e) of U.S. Provisional Application Nos. 60/502,329, 60/502,390, and 60/502,531, each filed on Sep. 12, 2003, and of U.S. Provisional Application No. 60/564,896, filed Apr. 23, 2004. U.S. patent application Ser. No. 11/123,879 claims the benefit of priority under 35 U.S.C. § 119(e) of U.S. Provisional Application No. 60/569,271, filed on May 8, 2004 and incorporated in its entirety by reference herein.

BACKGROUND OF THE INVENTION

1. Field of the Invention

The present application is in the field of optical fibers for propagating light, and more particularly is in the field of photonic-bandgap fibers having a hollow core, or a core with a refractive index lower than the cladding materials.

2. Description of the Related Art

Photonic-bandgap fibers (PBFs) have attracted great interest in recent years due to their unique advantages over conventional fibers. In particular, the propagation loss in an air-core PBF is not limited by the core material, and it is expected that the propagation loss can be exceedingly low. The nonlinear effects in an air-core PBF are very small, and in certain PBFs, the core can be filled with liquids or gases to generate the desired light-matter interaction. Numerous new applications enabled by these advantages have been demonstrated recently. Such applications are described, for example, in Burak Temelkuran et al., *Wavelength-scalable hollow optical fibres with large photonic bandgaps for $CO_2$ laser transmission*, Nature, Vol. 420, 12 Dec. 2002, pages 650-653; Dimitri G. Ouzounov et al., *Dispersion and nonlinear propagation in air-core photonic band-gap fibers*, Proceedings of Conference on Laser and Electro-Optics (CLEO) 2003, Baltimore, USA, 1-6 Jun. 2003, paper CThV5, 2 pages; M. J. Renn et al., *Laser-Guided Atoms in Hollow-Core Optical Fibers*, Physical Review Letters, Vol. 75, No. 18, 30 Oct. 1995, pages 3253-3256; F. Benabid et al., *Particle levitation and guidance in hollow-core photonic crystal fiber*, Optics Express, Vol. 10, No. 21, 21 Oct. 2002, pages 1195-1203; and Kazunori Suzuki et al., *Ultrabroad band white light generation from a multimode photonic bandgap fiber with an air core*, Proceedings of Conference on Laser and Electro-Optics (CLEO) 2001, paper WIPD1-11, pages 24-25, which are hereby incorporated herein by reference.

Calculations of selected properties of the fundamental mode of the PBFs have also been reported in, for example, R. F. Cregan et al., *Single-Mode Photonic Band Gap Guidance of Light in Air*, Science, Vol. 285, 3 Sep. 1999, pages 1537-1539; Jes Broeng et al., *Analysis of air guiding photonic bandgap fibers*, Optics Letters, Vol. 25, No. 2, Jan. 15, 2000, pages 96-98; and Jes Broeng et al., *Photonic Crystal Fibers: A New Class of Optical Waveguides*, Optical Fiber Technology, Vol. 5, 1999, pages 305-330, which are hereby incorporated herein by reference.

Surface modes, which do not exist in conventional fibers, are defect modes that form at the boundary between the air core and the photonic-crystal cladding. Surface modes can occur when an infinite photonic crystal is abruptly terminated, as happens for example at the edges of a crystal of finite dimensions. Terminations introduce a new set of boundary conditions, which result in the creation of surface modes that satisfy these conditions and are localized at the termination. See, for example, F. Ramos-Mendieta et al., *Surface electromagnetic waves in two-dimensional photonic crystals: effect of the position of the surface plane*, Physical Review B, Vol. 59, No. 23, 15 Jun. 1999, pages 15112-15120, which is hereby incorporated herein by reference.

In a photonic crystal, the existence of surface modes depends strongly on the location of the termination. See, for example, A. Yariv et al., *Optical Waves in Crystals: Propagation and Control of Laser Radiation*, John Wiley & Sons, New York, 1984, pages 209-214, particularly at page 210; and J. D. Joannopoulos et al., *Photonic Crystals: Molding the flow of light*, Princeton University Press, Princeton, N.J., 1995, pages 54-77, particularly at page 73; which are hereby incorporated herein by reference; and also see, for example, F. Ramos-Mendieta et al., *Surface electromagnetic waves in two-dimensional photonic crystals: effect of the position of the surface plane*, cited above. For example, in photonic crystals made of dielectric rods in air, surface modes are induced only when the termination cuts through rods. A termination that cuts only through air is too weak to induce surface modes. See, for example, J. D. Joannopoulos et al., *Photonic Crystals: Molding the flow of light*, cited above.

Unless suitably designed, a fiber will support many surface modes. Recent demonstrations have shown that surface modes play a particularly important role in air-core PBFs, and mounting evidence indicates that surface modes impose serious limitations in air-core photonic-bandgap fibers by contributing to propagation losses. See, for example, K. Saitoh et al., *Air-core photonic band-gap fibers: the impact of surface modes*, Optics Express, Vol. 12, No. 3, February 2004, pages 394-400; Douglas C. Allan et al., *Surface modes and loss in air-core photonic hand-gap fibers*, in Photonic Crystals Materials and Devices, A. Adibi et al. (eds.), Proceedings of SPIE, Vol. 5000, 2003, pages 161-174; Wah Tung Lau et al., *Creating large bandwidth line defects by embedding dielectric wave guides into photonic crystal slabs*, Applied Physics Letters, Vol. 81, No. 21, 18 Nov. 2002, pages 3915-3917; Dirk Müller et al., *Measurement of Photonic Band-gap Fiber Transmission from 1.0 to 3.0 μm and Impact of Surface Mode Coupling*, Proceedings of Conference on Laser and Electro-Optics (CLEO) 2003, Baltimore, USA, 1-6 Jun. 2003, paper QTuL2, 2 pages; Hyang Kyun Kim et al., *Designing air-core photonic-bandgap fibers free of surface modes*, IEEE Journal of Quantum Electronics, Vol. 40, No. 5, May 2004, pages 551-556; and Michel J. F. Digonnet et al., *Simple geometric criterion to predict the existence of surface modes in air-core photonic-bandgap fibers*, Optics Express, Vol. 12, No. 9, May 2004, pages 1864-1872, which are hereby incorporated herein by reference. Also see, for example, J. D. Joannopoulos et al., *Photonic Crystals: Molding the flow of light*, cited above; A. Yariv et al., *Optical Waves in Crystals: Propagation and Control of Laser Radiation*, cited above; and F. Ramos-Mendieta et al., *Surface electromagnetic waves in two-dimensional photonic crystals: effect of the position of the surface plane*, cited above.

In contrast to surface modes, a core mode (e.g., a fundamental core mode) of an air-core PDF without a silica core ring is one in which the peak of the mode intensity is located in the core. In most cases, most of the energy will also be contained within the air core. The propagation constants of surface modes often fall close to or can even be equal to the propagation constant of the fundamental core mode. See, for example, K. Saitoh et al., *Air-core photonic band-gap fibers: the impact of surface modes*, Douglas C. Allan et al., *Surface modes and loss in air-core photonic band-gap fibers*, in *Photonic Crystals Materials and Devices*, and Dirk Müller et al., *Measurement of Photonic Band-gap Fiber Transmission from 1.0 to 3.0 µm and Impact of Surface Mode Coupling*, which are cited above.

The fundamental core mode generally couples quite strongly to one or more of these surface modes by a resonant coupling mechanism or a nearly-resonant coupling mechanism. Such coupling may be caused, for example, by random (e.g., spatial) perturbations in the fiber index profile or cross-section. Since surface modes are inherently lossy due to their high energy density in the dielectric of the fiber, such coupling is a source of propagation loss. Furthermore, since surface modes occur across the entire bandgap, no portion of the available spectrum is immune to this loss mechanism. Recent findings have demonstrated that surface modes are a cause of the reduced transmission bandwidth in a 13-dB/km air-core PBF manufactured by Corning. See, for example, N. Venkataraman et al., *Low loss* (13 *d/km*) *air core photonic band-gap fibre*, Proceedings of European Conference on Optical Communication, ECOC 2002, Copenhagen, Denmark, PostDeadline Session 1, PostDeadline Paper PD1.1, Sep. 12, 2002; and C. M. Smith, et al., *Low-loss hollow-core silica/air photonic bandgap fibre*, Nature, Vol. 424, No. 6949, 7 Aug. 2003, pages 657-659, which are incorporated by reference herein. This effect is believed to be the source of the remaining loss (approximately 13 dB/km) in this air-core photonic-bandgap fiber. See, for example, Douglas C. Allan et al, *Photonic Crystals Materials and Devices*, cited above. Understanding the physical origin of surface modes and identifying fiber configurations that are free of such modes across the entire bandgap is therefore of importance in the ongoing search for low-loss PBFs.

SUMMARY OF THE INVENTION

In certain embodiments, an optical fiber comprises a cladding comprising a first material having a first refractive index and a pattern of a second material formed therein. The second material has a second refractive index lower than the first refractive index. The cladding has a plurality of first regions that support intensity lobes of the highest frequency bulk mode and has a plurality of second regions that do not support intensity lobes of the highest frequency bulk mode. The optical fiber further comprises a central core region formed in the cladding. The optical fiber further comprises a core ring having an outer perimeter. The core ring surrounds the central core region, wherein the outer perimeter of the core ring passes only through the second regions of the cladding.

In certain embodiments, an optical fiber comprises a cladding comprising a dielectric material having a first refractive index and a periodic pattern of regions formed therein. Each region has a substantially circular cross-section and has a second refractive index lower than the first refractive index. Each region is spaced apart from adjacent regions. Each group of three regions adjacent to one another defines a portion of the dielectric material having a cross-section sized to enclose an inscribed circle having a circumference tangential to the three adjacent regions. The optical fiber further comprises a core region formed in the cladding. The optical fiber further comprises a core ring having an outer perimeter. The core ring surrounds the core region, wherein the outer perimeter of the core ring does not pass through any of the inscribed circles.

In certain embodiments, an optical fiber comprises a cladding comprising a dielectric material having a first refractive index and having a periodic pattern of regions formed therein. Each region has a substantially circular cross-section. Each region has a second refractive index lower than the first refractive index. The optical fiber further comprises a central core region formed in the cladding. The optical fiber further comprises a core ring having a generally circular cross-section and an outer radius. The core ring surrounds the central core region, wherein the core ring induces ring surface modes having dispersion curves substantially decoupled from a fundamental mode dispersion curve of the optical fiber.

In certain embodiments, an optical fiber comprises a cladding comprising a dielectric material having a first refractive index and having a periodic pattern of regions formed therein. Each region has a substantially circular cross-section and has a second refractive index lower than the first refractive index. The optical fiber further comprises a central core region formed in the cladding. The optical fiber further comprises a core ring having a generally circular cross-section and a thickness. The core ring surrounds the central core region, wherein the thickness of the core ring is sufficiently small to support at most one ring-induced surface mode.

In certain embodiments, a method of designing an optical fiber is provided. The optical fiber comprises a material with a pattern of regions formed therein to form a cladding surrounding a core region. The material has a first refractive index and the pattern of regions has a second refractive index lower than the first refractive index. The method comprises designing a substantially circular core ring in the cladding. The core ring surrounds the core region and has an outer radius, an inner radius, and a thickness between the outer radius and the inner radius. At least one of the outer radius, the inner radius, and the thickness is selected to reduce losses of the optical fiber.

In certain embodiments, a method of designing an optical fiber is provided. The optical fiber comprises a material with a pattern of regions formed therein to form a cladding surrounding a core region. The material has a first refractive index and the pattern of regions has a second refractive index lower than the first refractive index. The method comprises designing a substantially circular core ring in the cladding. The core ring surrounds the core region and has an outer radius, an inner radius, and a thickness between the outer radius and the inner radius. At least one of the outer radius, the inner radius, and the thickness is selected to reduce the number of ring-induced surface modes.

BRIEF DESCRIPTION OF THE DRAWINGS

FIG. 3 illustrates contour lines that represent equal intensity lines of a typical surface mode for the air-core PBF of FIG. 1.

FIG. 4 illustrates contour lines that represent equal intensity lines of the fundamental core mode for the air-core PBF of FIG. 1.

FIG. 27A illustrates a calculated $\omega$-k diagram of the air-core fiber (no ring around the core) of FIG. 26A.

DETAILED DESCRIPTION OF EXEMPLARY EMBODIMENTS

Figure 1:
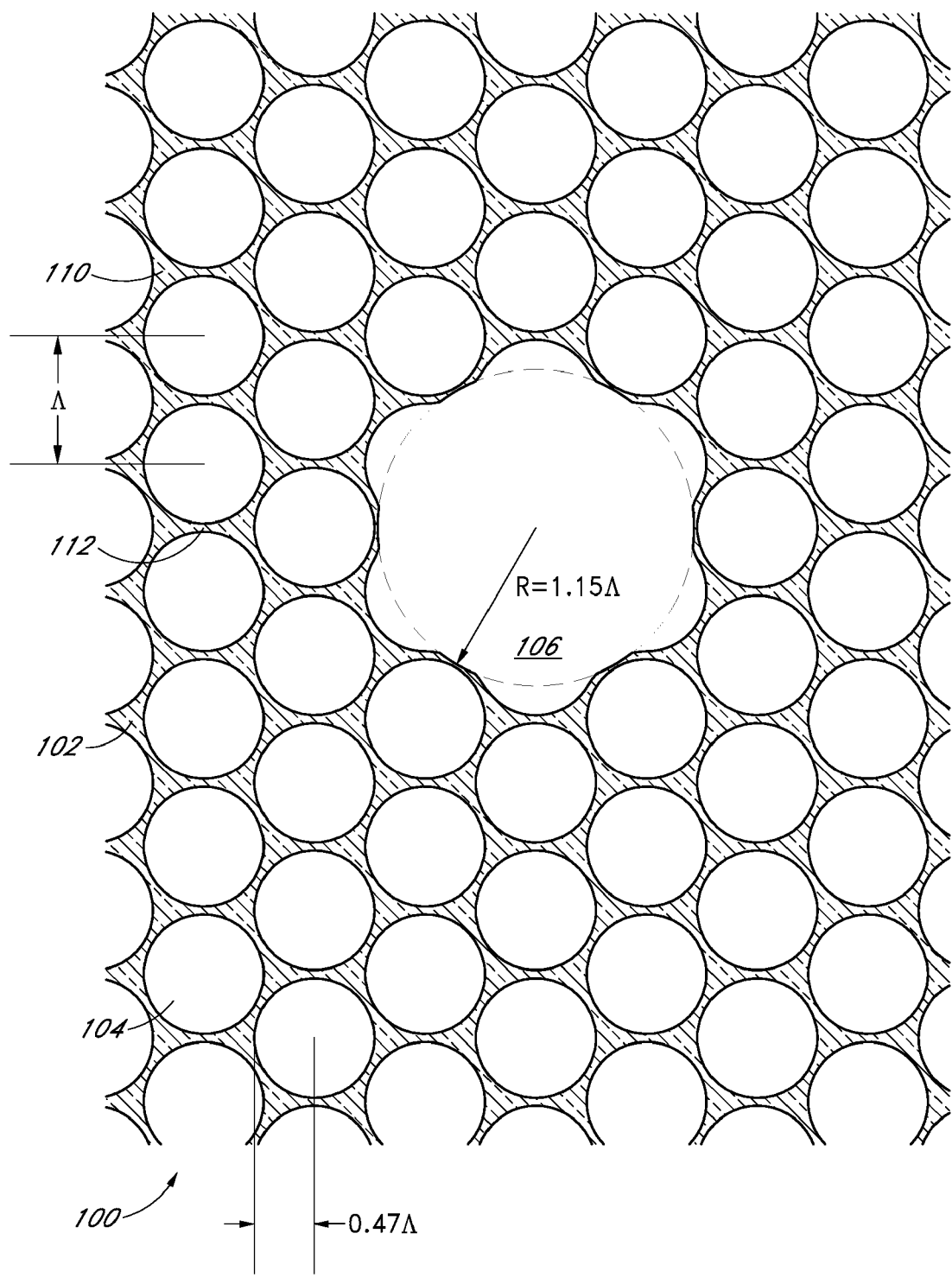
FIG. 1 illustrates a partial cross section of an exemplary triangular-pattern air-core photonic-bandgap fiber (PBF) for a core radius of 1.15 Λ and a hole radius ρ of approximately 0.47 Λ.

Certain embodiments disclosed herein are based on information obtained in an investigation of the properties of the core modes and the surface modes of PBFs using numerical simulations. The investigation focused on the most common PBF geometry, namely fibers with a periodic, triangular pattern of cylindrical air-holes in the cladding and a circular core obtained by introducing an air defect. Such fibers are described, for example, in R. F. Cregan et al., *Single-Mode Photonic Band Gap Guidance of Light in Air*, cited above; Jes Broeng et al., *Analysis of air-guiding photonic bandgap* fibers, cited above; and Jes Broeng et al., *Photonic Crystal Fibers: A new class of optical waveguides*, Optical Fiber Technology, cited above. The results are also applicable to a broad range of air-hole patterns (e.g., hexagonal patterns, square patterns, etc.), hole shapes, core shapes, and core ring shapes. The results are also applicable to other photonic-bandgap fibers, namely, fiber with similar geometries that operate on the same photonic-bandgap principle but with a core not necessarily filled with air (e.g., a core filled with another gas, a vacuum, a liquid, or a solid), with cladding holes not necessarily filled with air (e.g., cladding holes filled with another gas, a vacuum, a liquid, or a solid), and with solid portions of the cladding or the core ring not necessarily made of silica (e.g., another solid or a multiplicity of solids). As used herein, hole or a core that is not filled with a solid or a liquid is referred to herein as being hollow. It is understood here that the respective refractive indices of the materials that make up the core, the cladding holes, and the solid portion of the cladding are selected in certain embodiments such that the fiber structure supports a guided mode via the photonic-bandgap effect. This implies that the refractive index of the core and the refractive index of the holes is lower than that of the refractive index of the solid portions of the cladding, and that the difference between these indices is large enough to support the guided mode.

New geometries are proposed herein for air-core fibers or fibers with a core that has a lower refractive index than the solid portions of the cladding. In certain embodiments, these geometries have ranges of core characteristic dimensions (e.g., core radii when the core is circular) for which the fiber core has reduced propagation losses due to surface modes. In particular, for certain embodiments having a circular core with a radius between about 0.7 Λ and about 1.05 Λ, where Λ is the hole-to-hole spacing of the triangular pattern, the core supports a single mode and does not support any surface modes. The absence or reduction of surface modes suggests that fibers in accordance with certain embodiments described herein exhibit substantially lower losses than current fibers. As further shown below, the existence of surface modes in the defect structure can be readily predicted either from a study of the bulk modes alone or even more simply by a straightforward geometric argument. Because the structure is truly periodic, prediction of the existence of surface modes in accordance with the methods described below is quicker and less complicated than a full analysis of the defect modes.

Photonic-Bandgap Fibers with No Core Ring

In certain embodiments, the methods disclosed herein can be used to predict whether a particular fiber geometry will support surface modes so that fibers can be designed and manufactured that do not support surface modes or that support only a reduced number of surface modes. In particular, in certain embodiments, the presence of surface modes can be avoided or reduced by selecting the core radius or other characteristic dimension such that the edge of the core does not cut through any of the circles inscribed in the veins (e.g., the solid intersection regions) of the PBF lattice. The technique works for broad ranges of geometries and hole sizes.

In order to avoid or reduce surface modes, certain embodiments of the techniques described herein are used to design the core shape such that the core does not intersect any of the veins of the PBF lattice (e.g., the core intersects only the segments that join the veins of the PBF lattice). By following this general criterion, PBFs can be designed to be free of surface modes.

Certain embodiments described herein are based on a photonic band-gap fiber (PBF) with a cladding photonic crystal region comprising a triangular lattice comprising a plurality of circular holes filled with a gas (e.g., air) in silica or other solids, where the holes are spaced apart by a period Λ. See, e.g., R. F. Cregan et al., *Single-Mode Photonic Band Gap Guidance of Light in Air*, cited above; Jes Broeng et al., *Analysis of air-guiding photonic bandgap fibers*, cited above; and Jes Broeng et al., *Photonic Crystal Fibers: A New Class of Optical Waveguides*, cited above. For simplicity, such fibers are referred to herein as air-hole fibers; however, as discussed above, the following discussions and results are also applicable to photonic-bandgap fibers with a core and/or all or some of the cladding holes filled with other materials besides air (e.g., another gas, a vacuum, a liquid, or a solid) and with solid portions of the cladding made of materials other than silica (e.g., a different solid or a multiplicity of solids). Furthermore, the results are also adaptable to other patterns of holes (e.g., hexagonal patterns, square patterns, etc.).

A partial cross section of an exemplary triangular-pattern air-core PBF 100 is illustrated in FIG. 1. As illustrated, the fiber 100 comprises a solid dielectric lattice 102 comprising a plurality of air holes 104 surrounding an air core 106. Three exemplary adjacent holes 104 are shown in more detail in FIG. 2. The portion of the solid lattice 102 between any three adjacent holes 104 is referred to as a vein (or a corner) 110, and the thinner regions connecting two adjacent veins (i.e., a region between any two adjacent holes) is referred to as a segment (or a membrane) 112. In the illustrated embodiment, each air hole 104 has a radius ρ. The center-to-center spacing of adjacent air holes 104 is referred to as the period Λ of the photonic crystal.

As will be discussed in more detail below, each vein 110 can be approximated by an inscribed circle 114 of radius α, wherein the circumference of the inscribed circle 114 is tangential to the circumferences of three holes 104 surrounding the vein 110. Simple geometric calculations readily show that the radius α of the inscribed circle 114 is related to the radius ρ and the period Λ of the air holes 104 as follows:

$$a = (\Lambda/\sqrt{3}) - \rho$$

As illustrated in FIG. 1, the air-core 106 of the PBF 100 is advantageously created by introducing a larger cylindrical air hole of radius R at the center of the fiber. The location of this cylinder, reproduced in FIG. 1 as a dashed circle, is referred to herein as the edge of the core 106. The radius R is referred to herein as the characteristic dimension of the air-core 106. In the example of the circular core illustrated in FIG. 1, the radius R is the radius of the circular core. The following discussion is adaptable to cores having other shapes and characteristic dimensions (e.g., the shortest distance from the center to the nearest boundary of a polygonal-shaped core). In the PBF 100 of FIGS. 1 and 2, the radius R is selected to be 1.15 Λ, and the radius ρ of each air hole 104 is selected to be 0.47 Λ. For example, the air-core 106 of radius 1.15 Λ is advantageously selected because the core radius corresponds to a core formed in practice by removing seven cylinders from the center of the PBF preform (e.g., effectively removing the glass structure between the seven cylinders). Such a configuration is described, for example, in J. A. West et al., *Photonic Crystal Fibers, Proceedings of 27th European Conference on Optical Communications (ECOC'01—Amsterdam)*, Amsterdam, The Netherlands, Sep. 30-Oct. 4, 2001 paper ThA2.2, pages 582-585, which is hereby incorporated herein by reference. Other values of the radius R (e.g., between approximately 0.7 Λ and approximately 1.2 Λ) and the radius ρ (e.g., between approximately 0.49 Λ and 0.5 Λ) are also compatible with embodiments described herein.

Figure 2:
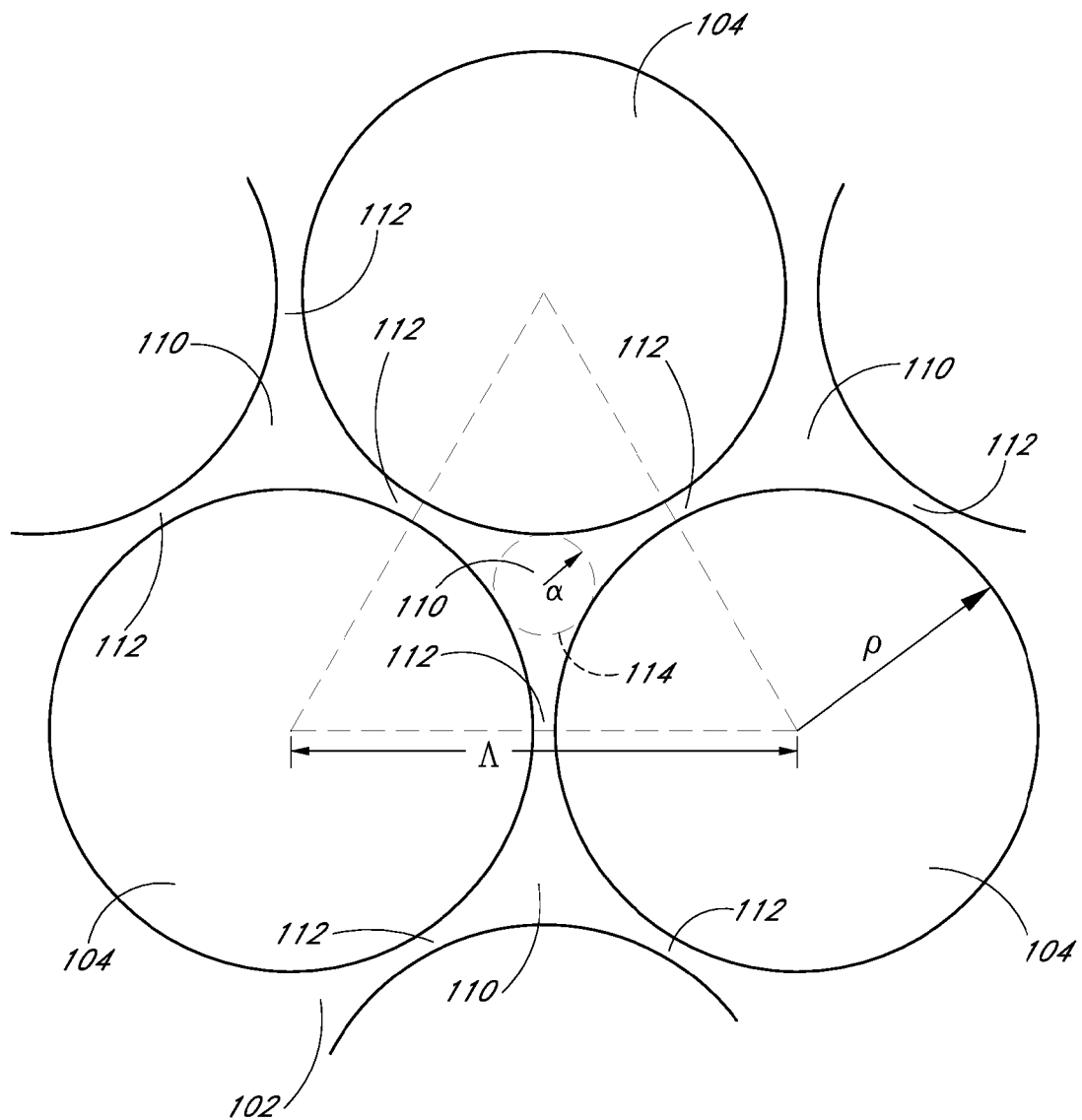
FIG. 2 illustrates an enlarged view of the partial cross section of FIG. 1 to provide additional detail on the spatial relationships between the air holes, the segments (membranes) between adjacent air holes and the veins (corners) at the intersections of the segments.

As discussed above, surface modes are defect modes that form at the boundary between the core 106 and the photonic-crystal cladding 102. A typical surface mode for the triangular-pattern air-core PBF 100 of FIGS. 1 and 2 is illustrated in FIG. 3. A typical fundamental core mode for the PBF 100 of FIGS. 1 and 2 is illustrated in FIG. 4. In FIGS. 3 and 4, the contour lines represent equal intensity lines. The outmost intensity line in each group has a normalized intensity of 0.1 and the innermost intensity line has a normalized intensity of 0.9, and each intervening intensity line represents a normalized step increase of 0.1.

Figure 5:
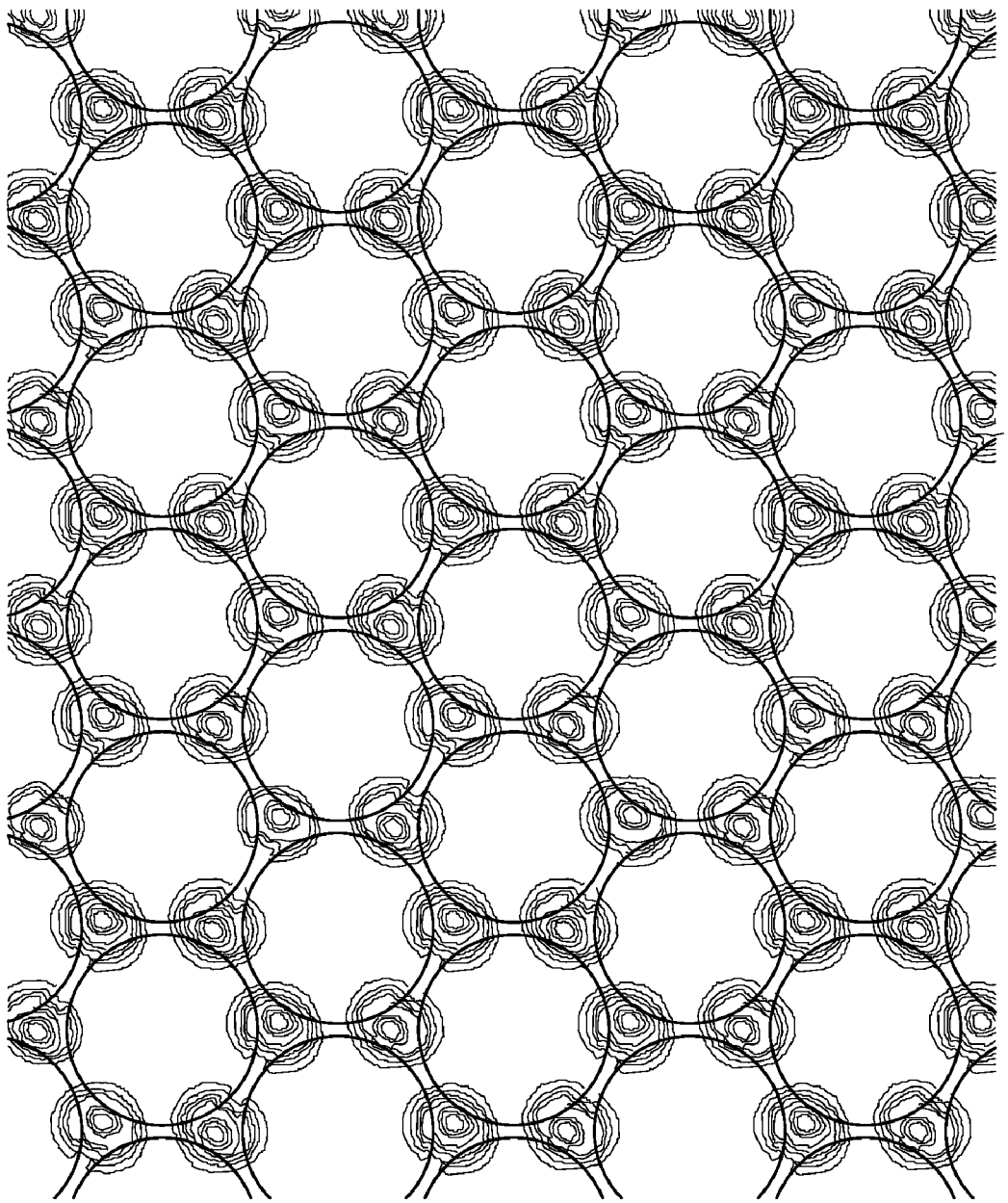
FIG. 5 illustrates contour lines that represent equal intensity lines of a typical bulk mode for the triangular-pattern air-core PBF of FIG. 1, but without the removal of the central structure to form the air core 106.

In the absence of a core, a PBF carries only bulk modes. An example of bulk mode is illustrated in FIG. 5. The bulk mode of FIG. 5 is calculated for the same triangular-pattern air-core PBF 100 illustrated in FIG. 1, but without the removal of the central structure to form the air core 106. As in FIGS. 3 and 4, the contour lines in FIG. 5 represent equal intensity lines.

The particular bulk mode illustrated in FIG. 5 comprises a series of narrow intensity lobes centered on each of the thicker dielectric corners 110 of the photonic crystal 102. Other bulk modes may have different lobe distributions (e.g., all the lobes may be centered on membranes 112 rather than on corners 110).

As discussed above, a fiber will support many surface modes unless the fiber is suitably designed to eliminate or reduce the number of surface modes. As further discussed above, the propagation constants of the surface modes are often close to or equal to the propagation constant of the fundamental core mode, and, as a result, the core mode can easily be coupled to the surface modes (e.g., by random perturbations in the fiber cross section), which results in an increased propagation loss for the fundamental core mode. This problem is also present for other core modes besides the fundamental mode when the fiber is not single mode.

By varying the radius R of the air core 106, the effect of the core radius on the core modes and the effect of surface truncation on the surface mode behavior can be systematically studied. One such study is based on simulations performed on the University of Michigan AMD Linux cluster of parallel Athlon 2000MP processors using a full-vectorial plane-wave expansion method. An exemplary full-vectorial plane wave expansion method is described, for example, in Steven G. Johnson et al., *Block-iterative frequency-domain methods for Maxwell's equations in a planewave basis*, Optic Express, Vol. 8, No. 3, 29 Jan. 2001, pages 173-190, which is hereby incorporated herein by reference.

The simulations disclosed herein used a grid resolution of Λ/16 and a supercell size of 8 Λ×8 Λ. The solid portion of the cladding was assumed to be silica, and all holes were assumed to be circular and filled with air. When running the simulations with 16 parallel processors, complete modeling of the electric-field distributions and dispersion curves of all the core modes and surface modes of a given fiber typically takes between 7 hours and 10 hours.

The results of the simulation for a triangular pattern indicate that a photonic bandgap suitable for air guiding exists only for air-hole radii ρ larger than about 0.43 Λ. In certain embodiments, the largest circular air-hole radius that can be fabricated in practice (e.g., so that sufficient silica remains in the membranes 112 between adjacent air holes 104 to provide a supporting structure) is slightly higher than 0.49 Λ. In certain embodiments described herein, a structure is simulated that has an air-hole radius ρ between these two extreme values. In particular, ρ is selected to be approximately 0.5 Λ.

Although the simulations described herein are carried out for ρ=0.47 Λ, similar results have been obtained for any value of ρ between 0.43 Λ to 0.5 Λ, and the qualitative conclusions described herein are valid for any air-hole size in the range of 0.43 Λ to 0.5 Λ.

Figure 6:
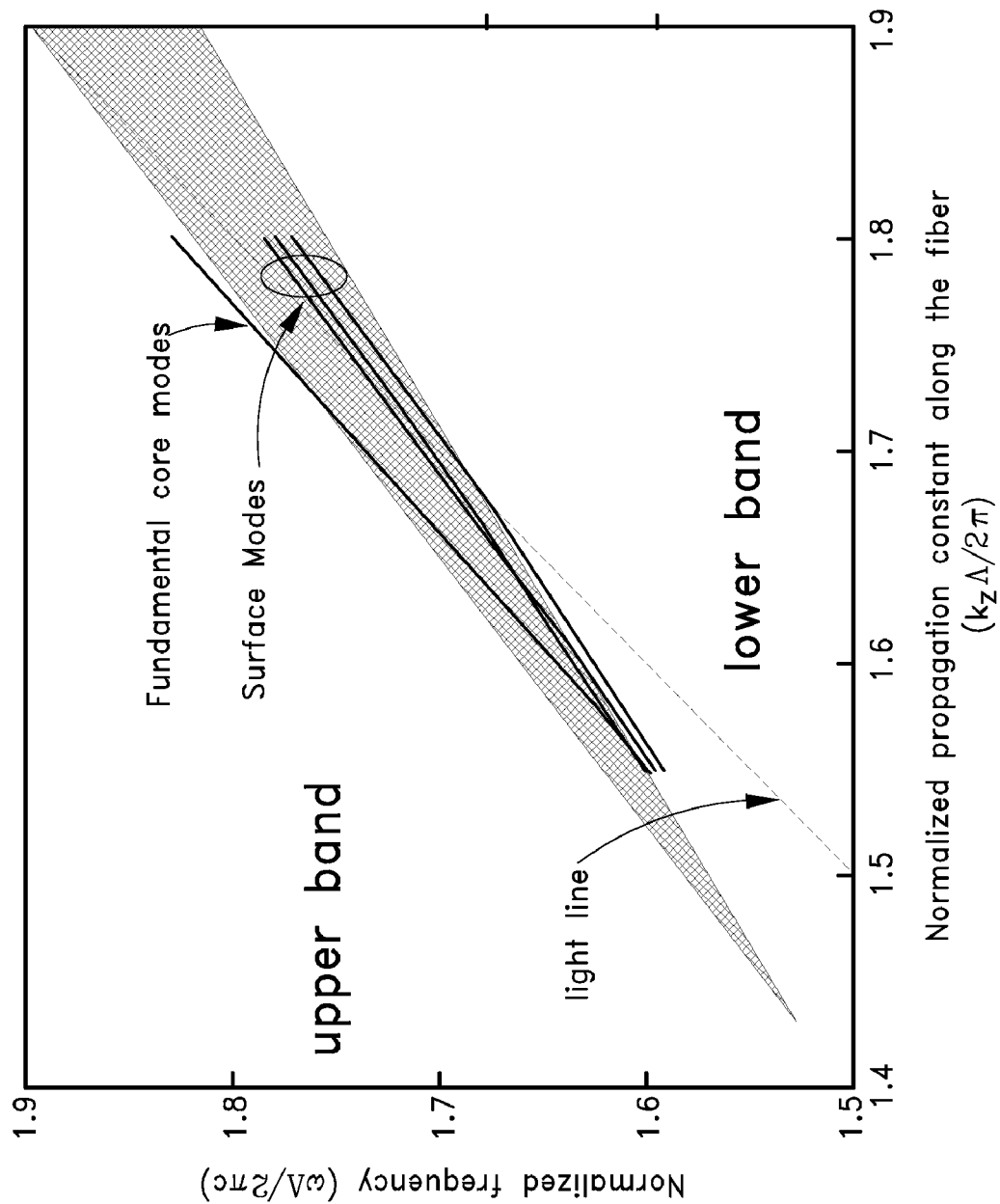
FIG. 6 illustrates dispersion curves of the defect modes for the air-core photonic-bandgap fiber (PBF) of FIG. 1 having a triangular-pattern of holes with a photonic-crystal structure of period (i.e., hole-to-hole spacing) $\Lambda$ and a hole radius $\rho$ of approximately 0.47 $\Lambda$, surrounding an air-core having a radius R of approximately 1.15 $\Lambda$, wherein the shaded (cross hatched) area represents the photonic bandgap of the crystal.

FIG. 6 illustrates the theoretical ω-$k_z$ diagram of the fiber geometry under study generated for a core radius R=1.15 Λ (see, for example, FIG. 1). In FIG. 6, the vertical axis is the optical angular frequency ω=2πc/λ normalized to 2πc/Λ (i.e., Λ/λ), where λ is the free-space wavelength of the light signal, c is the velocity of light in vacuum, and Λ is the photonic-crystal structure period. Thus, the vertical axis represents ωΛ/2πc=Λ/λ, which is a dimensionless quantity. The horizontal axis in FIG. 6 is the propagation constant along the axis of the fiber (z direction) $k_z$, normalized to 2π/Λ (i.e., $k_z$Λ/2π).

The first photonic bandgap supported by the infinite structure of the simulated fiber 100 of FIG. 1 is represented by the shaded (cross-hatched) region. The size and shape of the first photonic bandgap depends on the value of the radii ρ of the air holes 104 (which are equal to 0.47 Λ in the illustrated simulation), but the bandgap is very nearly independent of the dimension of the core 106. The dashed line in FIG. 6 represents the light line, below which no core modes can exist, irrespective of the core size and the core shape. The portion of the shaded region above the dashed line shows that in the simulated fiber 100, the normalized frequencies for which light can be guided in the air core range from approximately 1.53 to approximately 1.9.

The solid curves in FIG. 6 represent the dispersion relations of the core mode and the surface modes. The air core actually carries two fundamental modes. Each mode is nearly linearly polarized, and the polarization of each mode is orthogonal to the polarization of the other mode. These two modes are very nearly degenerate. In other words, the two modes have almost exactly the same dispersion curve within the bandgap. The topmost curve in FIG. 6 actually comprises two dispersion curves, one for each of these two fundamental modes; however, the two curves are so nearly identical that they cannot be distinguished on this graph. The related intensity profiles of selected modes at $k_z$Λ/2π=1.7 are plotted in FIG. 4 for one of the two fundamental core modes and in FIG. 3 for an exemplary surface mode. These profiles indicate that the highest-frequency modes inside the bandgap are the two fundamental core modes. All other modes in the bandgap are surface modes, which have their intensities localized at the core-cladding boundary, as shown in FIG. 3. The strength of the spatial overlap with the silica portions of the fiber is different for core and surface modes. The difference in strength results in the core mode having a group velocity close to c and the surface modes having a lower group velocity, as illustrated in FIG. 6.

FIG. 6 also illustrates another distinguishing feature of the core and surface modes. In particular, the curves for the surface modes always cross the light line within the bandgap. In contrast, the curves for the core modes never cross the light line within the bandgap.

Figure 7:
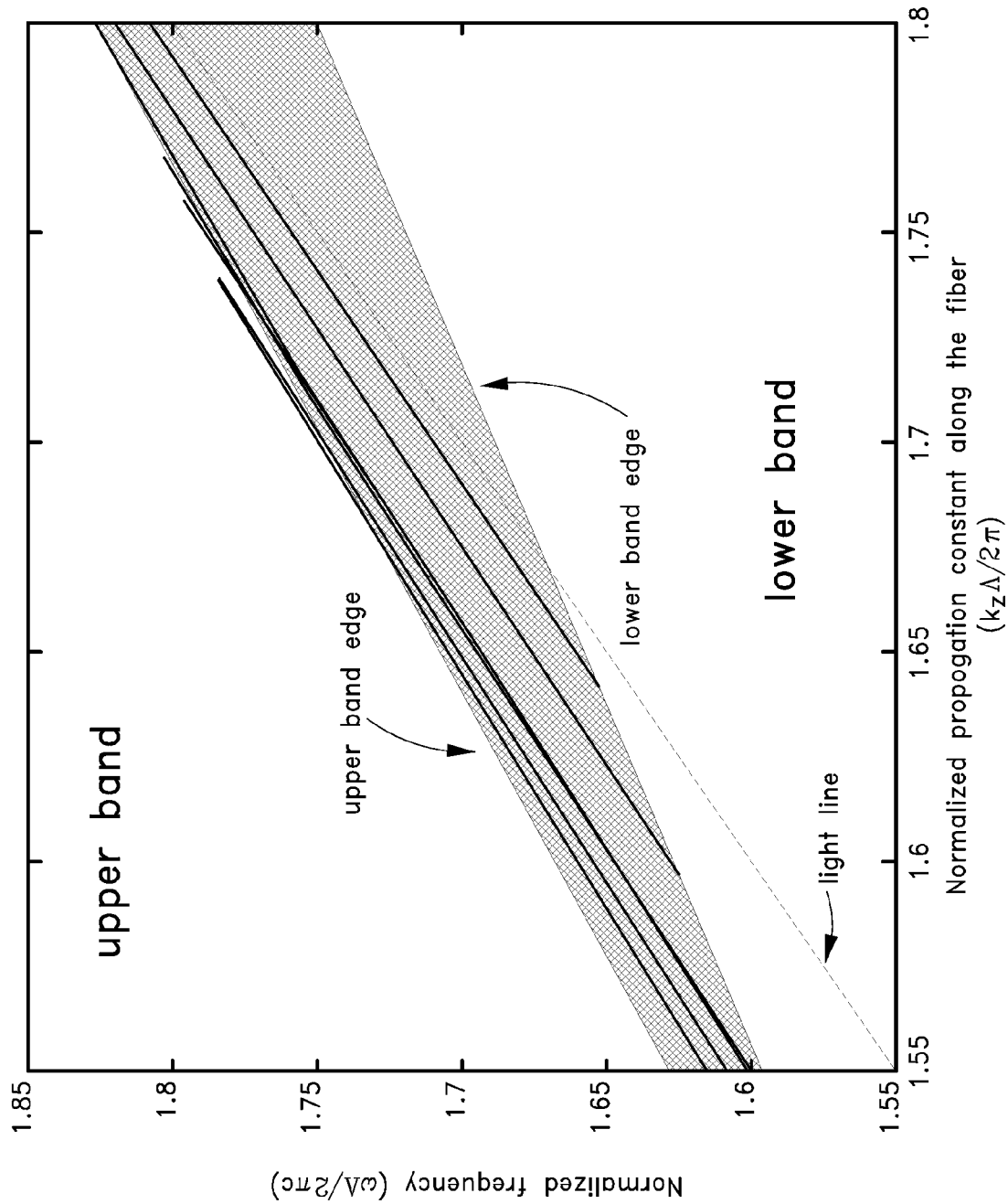
FIG. 7 illustrates dispersion curves of the defect modes for an air-core PBF having a core radius R of approximately 1.8 $\Lambda$.
Figure 8:
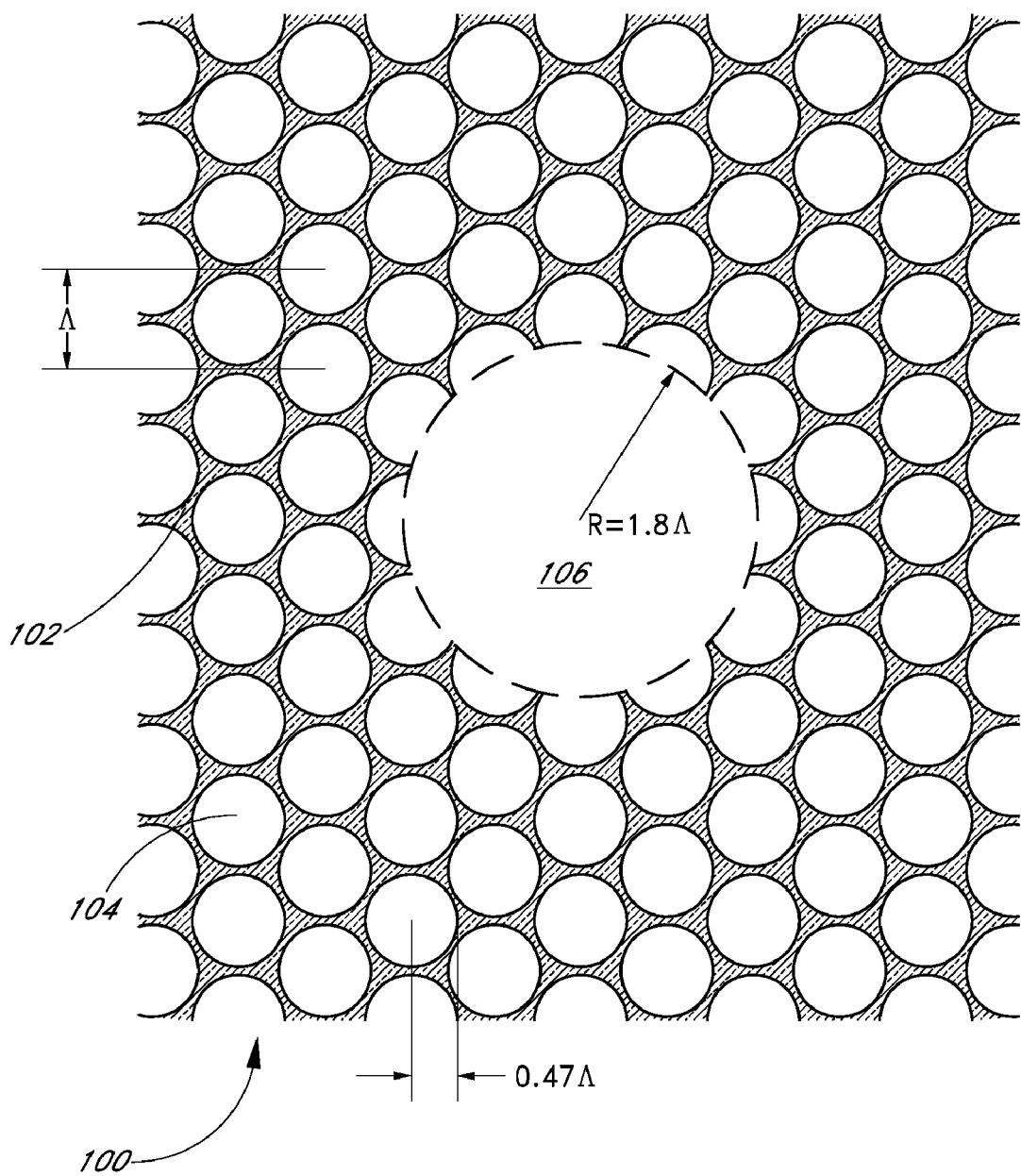
FIG. 8 illustrates a partial cross section showing the hole pattern and air-core shape of a PBF from which the dispersion curves of FIG. 7 are obtained.

The behaviors of the core mode and the surface modes are investigated as a function of defect size by changing the core radius R from 0.6 Λ to 2.2 Λ in 0.1 Λ steps. FIG. 7 illustrates the ω-$k_z$ diagram generated for the same fiber geometry as used to generate the information in FIG. 6, but for a larger core radius (R=1.8 Λ). As illustrated by the partial fiber cross section in FIG. 8, the larger core radius is formed, for example, by removing additional lattice structure beyond the central seven cylinders of the preform so that the surface of the core 106 intersects the thinner membranes 112 between the holes 104 rather than intersecting the thicker dielectric corners 110. As expected, the number of core modes appearing in FIG. 7 for the embodiment of FIG. 8 is greater than for the embodiment of FIG. 1. In addition, all the modes are core modes for this larger radius. As the frequency is increased from the low-frequency cutoff of the bandgap, the highest order core modes appear first, in a group of four or more modes (e.g., four in FIG. 7). This feature depends on the core size and mode degeneracy. See, for example Jes Broeng et al., *Analysis of air-guiding photonic bandgap fibers*, cited above. As the frequency is further increased, the number of modes reaches some maximum number (14 in the example illustrated in FIG. 7) at a normalized frequency ($\omega\Lambda/2\pi c$) of approximately 1.7. Above a normalized frequency of approximately 1.7, the number of modes gradually decreases to two (the two fundamental modes) at the high-frequency cutoff of the bandgap. The maximum number of core modes occurs at or in the vicinity of the frequency where the light line intersects the lower band edge. In the embodiment illustrated by the plot in FIG. 7, the light line intersects the lower band edge at a normalized frequency ($\omega\Lambda/2\pi c$) having a value of around 1.67. Note that in FIG. 7, many of the curves represent multiple modes that are degenerate and thus overlap in the diagram.

Figure 9:
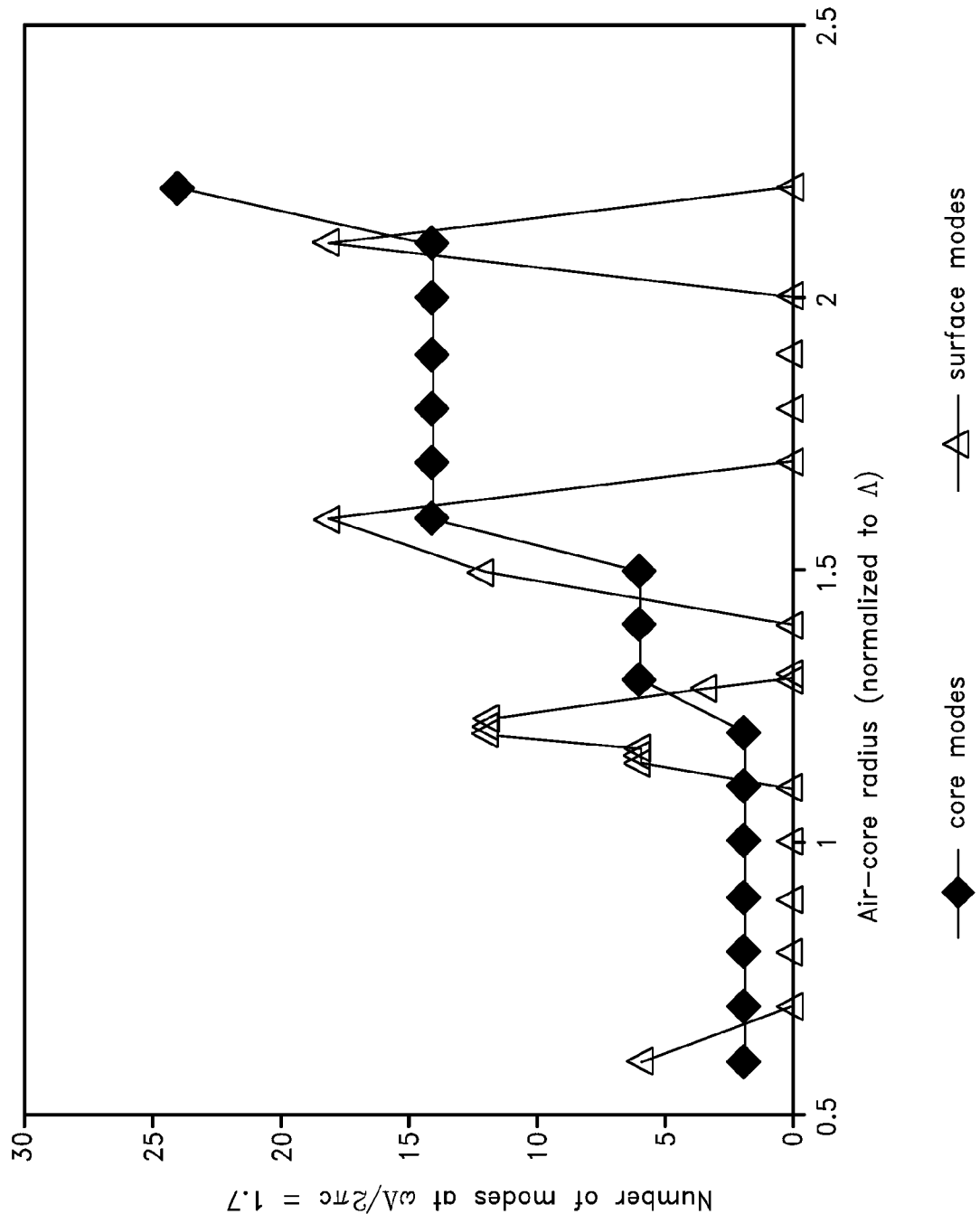
FIG. 9 illustrates a graph of the number of core modes (diamonds) and surface modes (triangles) versus the air-core radius at the normalized frequency $\omega\Lambda/2\pi c=1.7$.
Figure 10A:
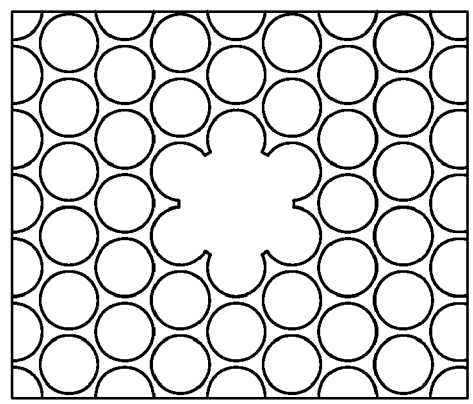
FIGS. 10A, 10B and 10C illustrate the core shapes for core radii of 0.9 $\Lambda$, 1.2 $\Lambda$, and 2.1 $\Lambda$, respectively, from which the information in FIG. 9 was derived.
Figure 10B:
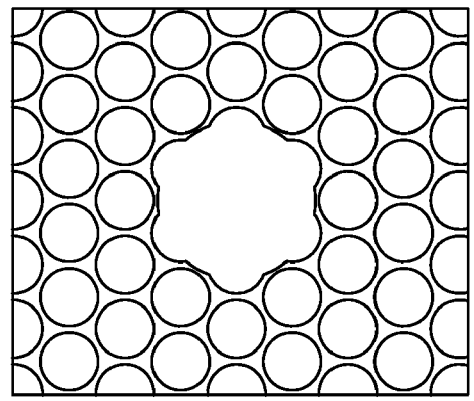
Figure 10C:
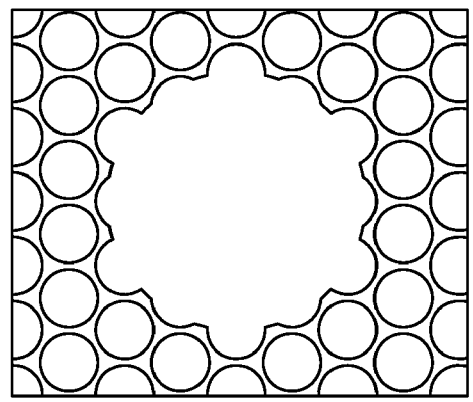

FIG. 9 illustrates the dependence of this maximum number of core modes (i.e., the number of modes is plotted at $\omega\Lambda/2\pi c=1.7$) on R. The number of surface modes is also shown in FIG. 9. In addition, core shapes for representative radii of R=0.9 $\Lambda$, R=1.2 $\Lambda$, and R=2.1 $\Lambda$ are illustrated in FIG. 10A, FIG. 10B and FIG. 10C, respectively. As stated above, the grid resolution used to generate the data points in FIG. 9 was $\Lambda/16$. However, to generate additional points in the more interesting range of core radii between 1.1 $\Lambda$ and 1.3 $\Lambda$, the grid size was reduced to $\Lambda/32$ in that range. As a result, the absolute number of surface modes predicted in this range does not scale the same way as in the rest of the graph. This is inconsequential since the primary interest in generating the data points is to determine the boundaries of the surface mode regions.

The behaviors of the core modes in PBFs and in conventional fibers based on total internal reflection have striking similarities. The fundamental mode, like an $LP_{01}$ mode, is doubly degenerate (see FIGS. 6 and 7), is very nearly linearly polarized, and exhibits a Gaussian-like intensity profile. See, for example, Jes Broeng et al., *Analysis of air-guiding photonic bandgap fibers*, cited above. The next four modes are also degenerate, and the electric field distributions of these four modes are very similar to those of the $HE_{21}^{odd}$, $HE_{21}^{even}$, $TE_{01}$, and $TM_{01}$ modes of conventional fibers. Many of the core modes, especially the low-order modes, exhibit a twofold degeneracy in polarization over much of the bandgap. As the core radius is increased, the number of core modes increases in discrete steps (see FIG. 9), from two (the two fundamental modes) to six (these two modes plus the four degenerate modes mentioned above), then 14 (because the next eight modes happen to reach cutoff at almost the same radius), etc.

FIG. 9 also illustrates another aspect of the modes. In particular, when R falls in certain bounded ranges, all modes are found to be core modes. The first three of the bounded ranges are:

range 1 from approximately 0.7 $\Lambda$ to approximately 1.1 $\Lambda$;
range 2 from approximately 1.3 $\Lambda$ to approximately 1.4 $\Lambda$; and
range 3 from approximately 1.7 $\Lambda$ to approximately 2.0 $\Lambda$.

Figure 11:
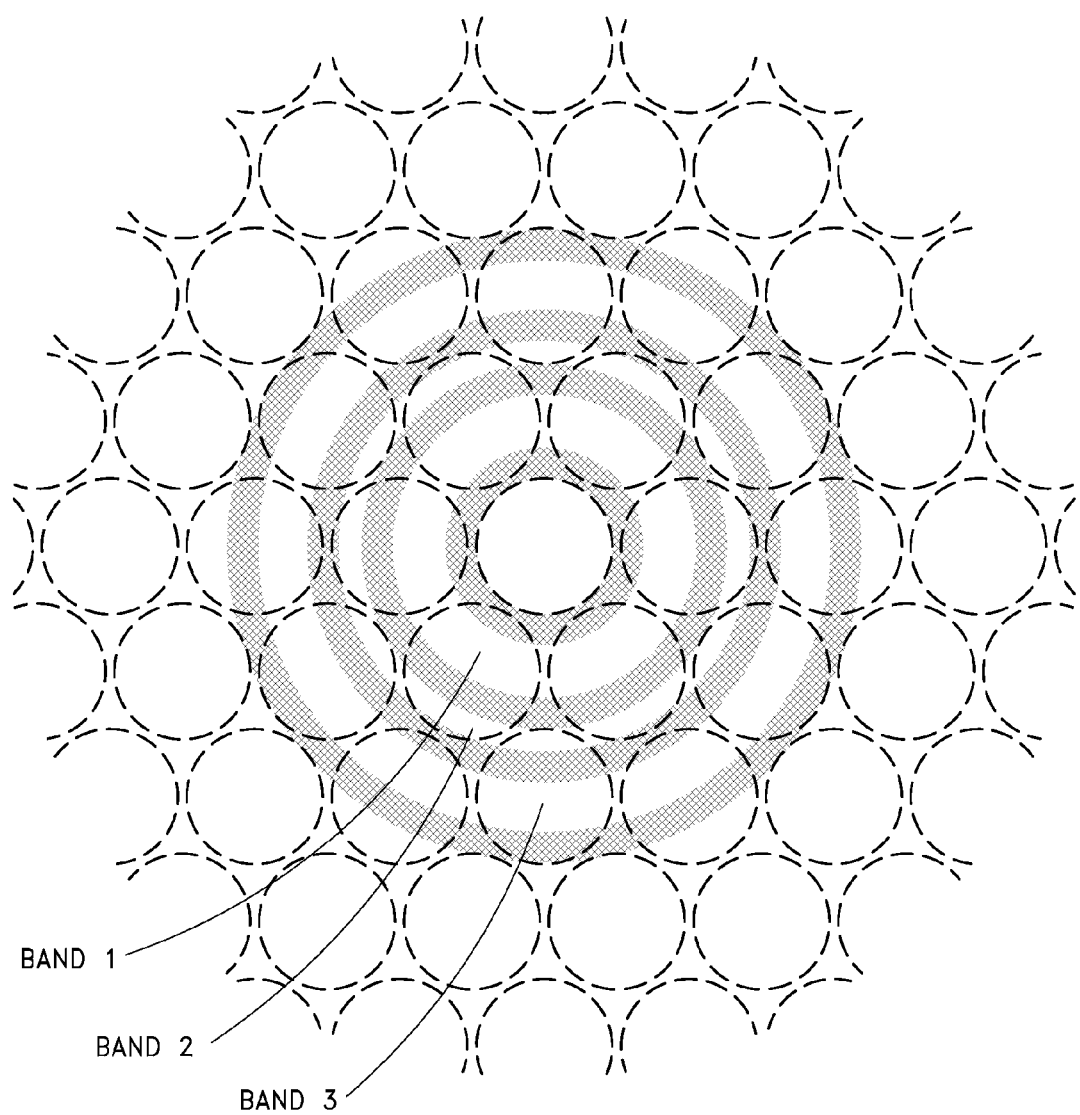
FIG. 11 illustrates a graphical representation of the air-core radius ranges that support core modes only (unshaded rings) and both core and surface modes (shaded rings).

FIG. 7 illustrates the case where R is equal to 1.8 $\Lambda$, which is one particular example of a surface-mode-free PBF in range 3. The surface-mode-free ranges determined by the computer simulation are illustrated schematically in FIG. 11. In FIG. 11, the background pattern of circles represents the infinite photonic crystal structure, the four shaded (cross hatched) annular areas represent the ranges of core radii that support surface modes, and the three unshaded annular areas (labeled as band 1, band 2 and band 3) represent the first three ranges of radii that are free of surface modes. Note that for radii less than 0.5 $\Lambda$ (e.g., the central unshaded portion of FIG. 11), the core does not support core modes that are guided by the photonic-bandgap effect.

FIG. 11 is simply a different way to graph the regions of no surface modes shown in FIG. 9. Thus, the three ranges of radii in FIG. 9 that support no surface modes, as shown by the open triangles that fall along the bottom horizontal axis, are graphed as the three white annular (unshaded) regions in FIG. 11 (bands 1, 2 and 3). The complementary (shaded) bands between the white bands correspond to the ranges of radii in FIG. 9 where the triangles are above the horizontal axis and thus represent radii that support surface modes.

In the first of the unshaded ranges in FIG. 11 (e.g., band 1 from approximately 0.7 $\Lambda$ to approximately 1.1 $\Lambda$), the core supports a single core mode and does not support any surface modes at all across the entire wavelength range of the bandgap, i.e., the PBF is truly single mode. There do not appear to be any previous reports of a single-mode all-silica PBF design in the literature. Note that in band 2, band 3 and all other bands representing larger radii, the fiber is no longer single mode.

An example of a terminating surface shape that falls in this single-mode range (e.g., range 1) is shown in FIG. 10A for R equal to 0.9 $\Lambda$. These particular configurations may be fabricated using small tips of glass protruding into the core using an extrusion method and other known fabrication techniques.

The number of surface modes is also strongly dependent on the core radius, albeit in a highly non-monotonic fashion. For core radii in the vicinities of approximately 0.6 $\Lambda$, approximately 1.2 $\Lambda$, approximately 1.6 $\Lambda$, and approximately 2.1 $\Lambda$, many surface modes are introduced, resulting in the peaks in the number of surface modes. The peaks are apparent in FIG. 9. Moreover, in these vicinities, the number of surface modes varies rapidly with R. Typical experimental PBFs are fabricated by removing the central 7 cylinders (R approximately equal to 1.15 $\Lambda$) or 19 cylinders (R approximately equal to 2.1 $\Lambda$) from the preform to form the core 106; however, these particular values of R, which happen to be more straightforward to manufacture, also happen to lead to geometries that support surface modes, as shown, for example, in FIG. 9.

Based on the foregoing results of the computer simulations, the basic conditions at which surface modes occur have been investigated and certain embodiments described herein have no surface modes. The basic conditions lead to the observation that surface modes are created when the surface of the core 106 intersects one or more of the dielectric corners 110 of the photonic crystal lattice 102. From this observation, a fast and simple geometric criterion is obtained for evaluating whether a particular fiber configuration supports surface modes. As discussed below, when the geometric criterion is applied to triangular-pattern PBFs 100 with a circular air core 106, the approximate geometric model yields quantitative predictions in acceptable agreement with the results of computer simulations described above.

As discussed above, surface modes can occur when an infinite photonic crystal is abruptly terminated, as happens for example at the edges of a crystal of finite dimensions. For example, in photonic crystals made of dielectric rods in air, surface modes are induced only when the termination cuts through rods. A termination that cuts only through air is too weak to induce surface modes.

In an air-core PBF 100, the core 106 also acts as a defect that perturbs the photonic crystal lattice 102 and may introduce surface modes at the edge of the core 106. Whether surface modes appear, and how many appear, depends on how the photonic crystal is terminated, which determines the magnitude of the perturbation introduced by the defect. In the absence of an air core, a PBF carries only bulk modes, as discussed above with respect to FIG. 5.

When the air core 106 is introduced as shown in FIGS. 1, 3 and 4, the core 106 locally replaces the dielectric material of the photonic crystal lattice 102 with air. The portions of the surface of the core 106 that cut through the cladding air holes 104 in FIG. 1 replace air by air. Thus, just as in the case of a planar photonic crystal (as described, for example, in J. D. Joannopoulos et al., *Photonic Crystals: Molding the flow of light*, cited above), those portions of the core surface do not induce significant perturbation. Only the portions on the core surface that cut through the dielectric corners 110 or the dielectric membrane 112 of the photonic crystal lattice 102 in FIG. 1 replace dielectric by air and thereby perturb the bulk modes of FIG. 5. Whether the perturbation is sufficient to potentially induce surface modes, such as the surface modes shown in FIG. 3, is discussed below.

Since a core 106 of any size and shape always cuts through some dielectric material, some perturbation is always introduced by the core 106. The sign of the perturbation is such that in the ω-k diagram, the bulk modes are all shifted up in frequency from their frequencies in their respective unperturbed positions. For a silica/air PBF 100, the perturbation is comparatively weak, and the frequency shift is small such that almost all perturbed bulk modes remain in a bulk mode band. Exceptions to the foregoing are modes from the highest frequency bulk-mode band of the lower band (referred to hereinafter as "HFBM"). Because such modes are located just below the bandgap in the ω-k diagram, the perturbation moves them into the bandgap as surface modes. See, for example, J. D. Joannopoulos et al., *Photonic Crystals: Molding the flow of light*, cited above.

Figure 13:
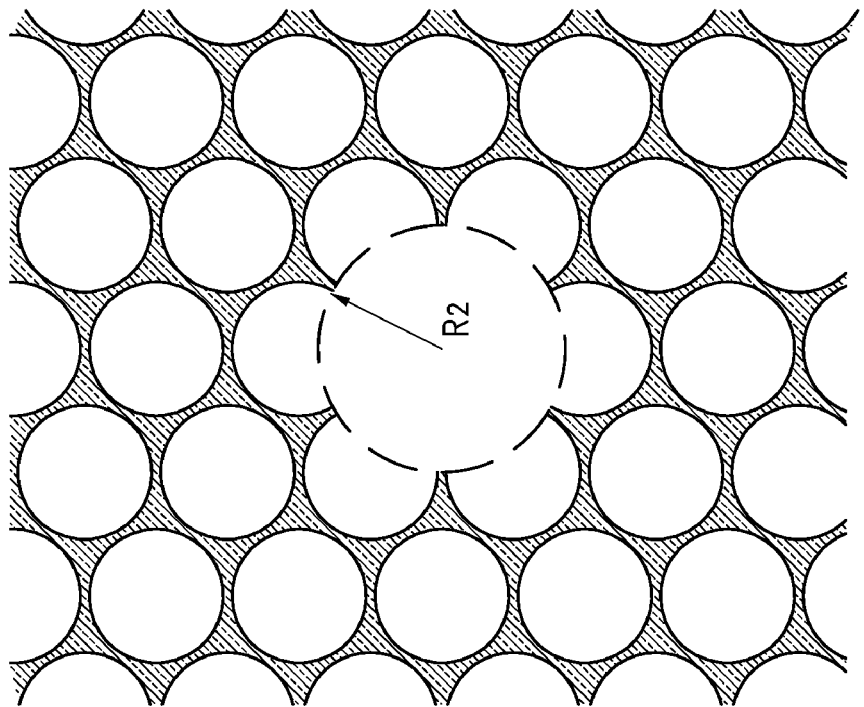
FIG. 13 illustrates the partial cross section of the triangular-pattern air-core PBF of FIG. 1 with a core of radius $R_2$ formed in the photonic crystal lattice, wherein the surface of the core does not intersect the corners of the photonic crystal lattice and wherein surface modes are not supported.
Figure 12:
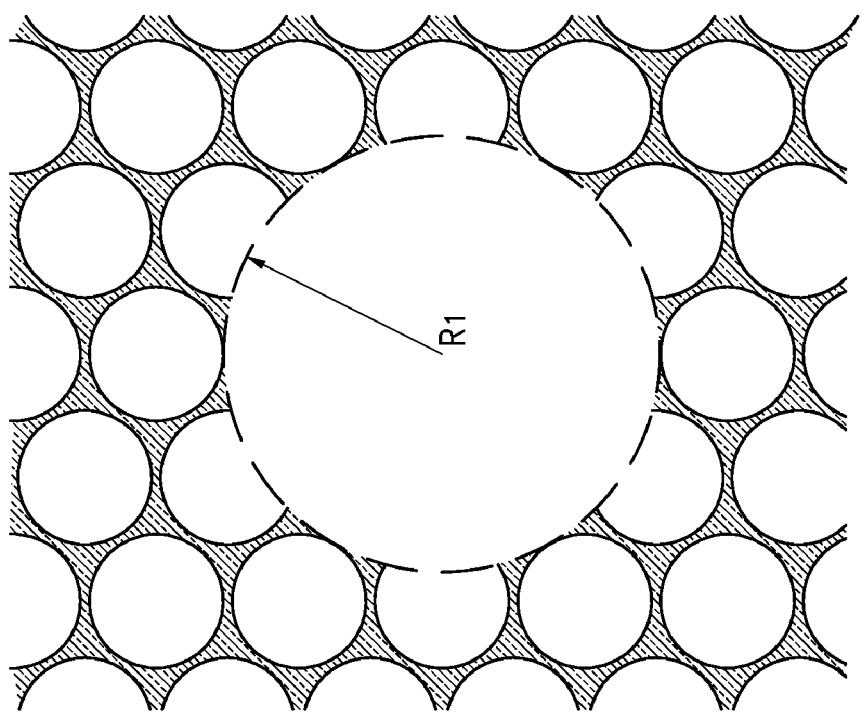
FIG. 12 illustrates the partial cross section of the triangular-pattern air-core PBF of FIG. 1 with a core of radius $R_1$ formed in the photonic crystal lattice, wherein the surface of the core intersects the corners of the photonic crystal lattice and wherein surface modes are supported.

Surface modes can be written as an expansion of bulk modes. For the weak perturbation considered here, it can be shown that the main term in this expansion is the HFBM, as expected in view of the origin of these surface modes. The HFBM is the bulk mode illustrated in FIG. 5. As illustrated in FIG. 5, the lobes of the mode are all centered on corners 110 of the crystal 102, which results in two important consequences. First, because surface modes are induced by a perturbation of this bulk mode, the lobes of the surface modes are also centered on the corners 110, as shown, for example, in FIG. 3. Second, for the HFBM to be perturbed and yield surface modes, the perturbation must occur in dielectric regions of the photonic crystal lattice 102 that carry a sizable HFBM intensity, e.g., in regions at the corners 110 of the photonic crystal 102. These observations show that surface modes are strongly correlated with the magnitude of the perturbation introduced by the air core 106 on the HFBM. If the surface of the core 106 intersects lobes of the HFBM at the corners 110 of the dielectric lattice 102 (as illustrated, for example, by a core of radius $R_1$ in FIG. 12), the perturbation is large and surface modes are induced. The number of surface modes then scales like the highest intensity intersected by the core 106 in the dielectric 102. Conversely, if the surface of the core 106 does not intersect any of the lobes of this bulk mode (as illustrated, for example, by a core of radius $R_2$ in FIG. 13), no surface modes are created.

Figure 14:
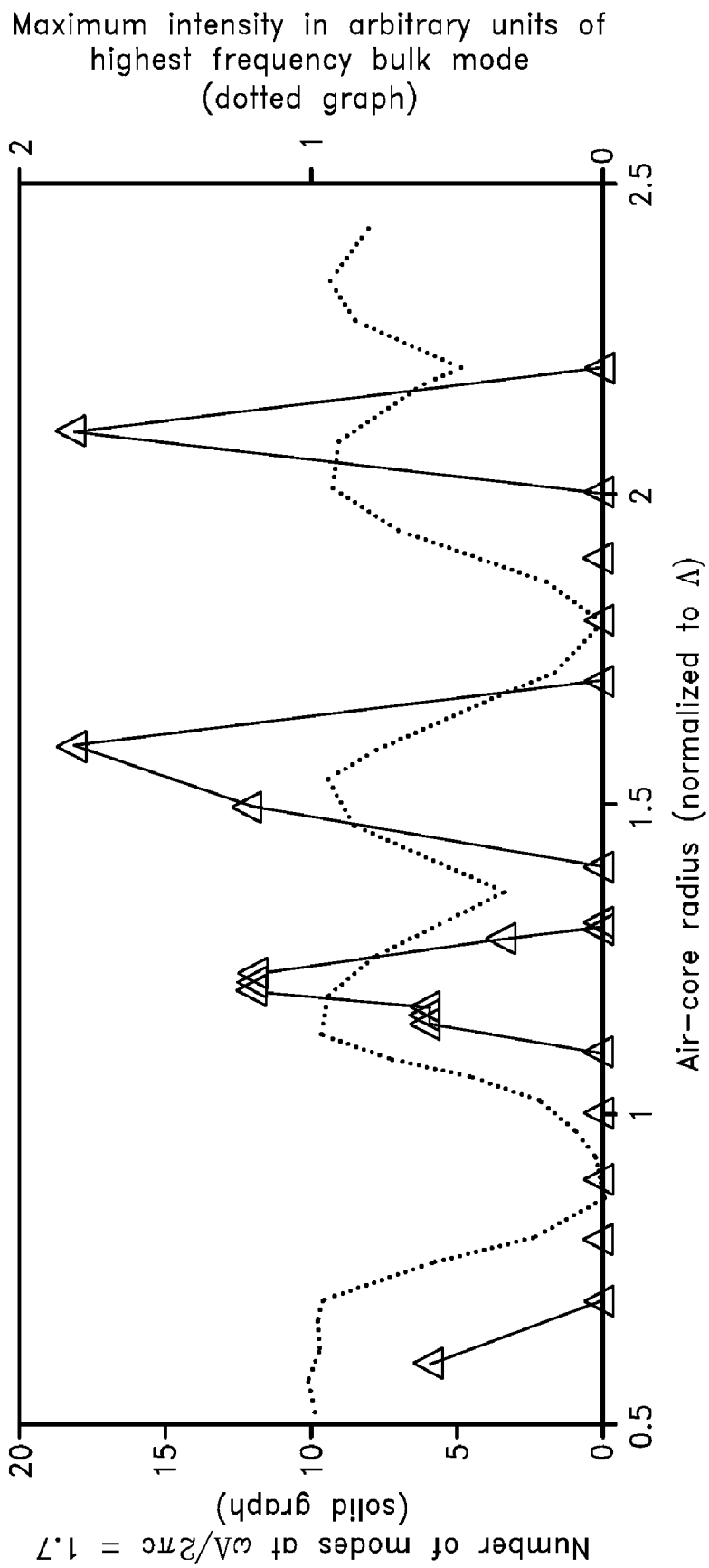
FIG. 14 illustrates a plot (dotted curve) of the maximum intensity of the highest frequency bulk mode on a circle of radius R as a function of R overlaid on the plot (solid curve) of the maximum number of surface modes as a function of R from FIG. 9.

The foregoing is illustrated in FIG. 14, which reproduces the plot of the number (values on the left vertical axis) of surface modes at $\omega\Lambda/2\pi c=1.7$ on a circle of radius R as a function of R normalized to Λ (horizontal axis) as a solid curve. FIG. 14 also includes a plot (dotted curve) of the maximum intensity (values in arbitrary units on the right vertical axis) of the highest frequency bulk mode. FIG. 14 clearly shows the relationship between the maximum intensity and the number of surface modes. The two curves in FIG. 14 are clearly strongly correlated, which confirms that surface modes occur for radii R such that the edge of the core cuts through high-intensity lobes of the highest frequency bulk mode. Based on this principle, a first approximate dependence of the number of surface modes on the core radius was developed. By comparison to the results of exact simulations, the foregoing shows that the results obtained using this HFBM criterion predicts the presence or absence of surface modes fairly accurately. Of course, many other kinds of perturbations can induce surface modes in the photonic crystal 102, so that the foregoing condition for the absence of surface modes is a necessary condition but it is not always a sufficient condition.

In one criterion for determining the presence of the surface modes, the electromagnetic intensity of the highest frequency bulk modes is integrated along the edge of the core. It is sufficient to perform such integration for either one of the two doubly degenerate modes, since the integrations for both modes are equal, as required by symmetry.

Figure 15B:
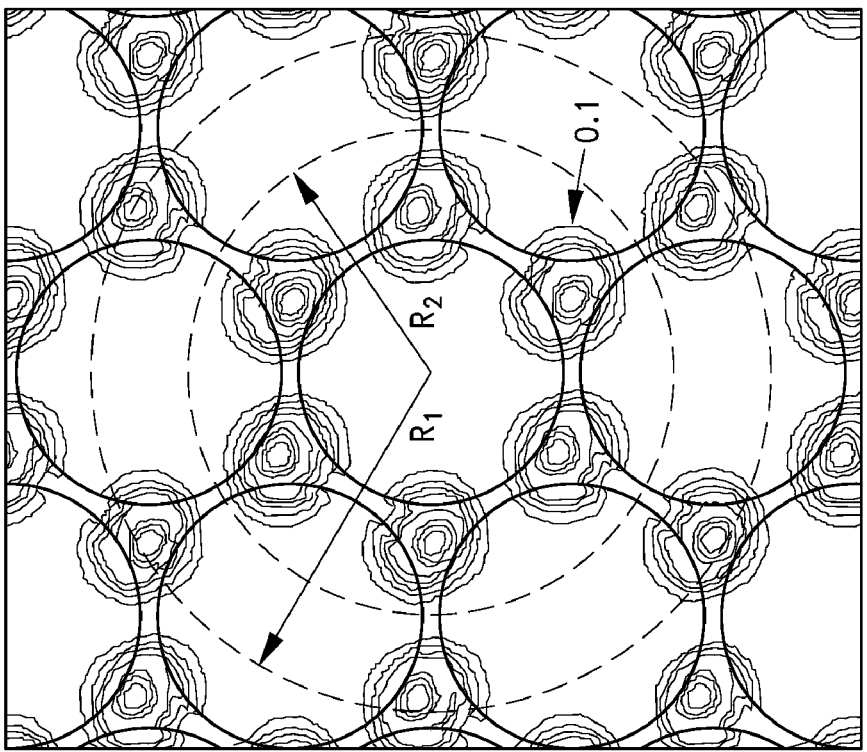
FIGS. 15A and 15B illustrate intensity contour maps of the two highest frequency doubly degenerate bulk modes below the bandgap at the $\Gamma$ point, wherein $R_1$ is an example of a core radius that supports both core modes and surface modes, and $R_2$ is an example of a core radius that supports only core modes.
Figure 15A:
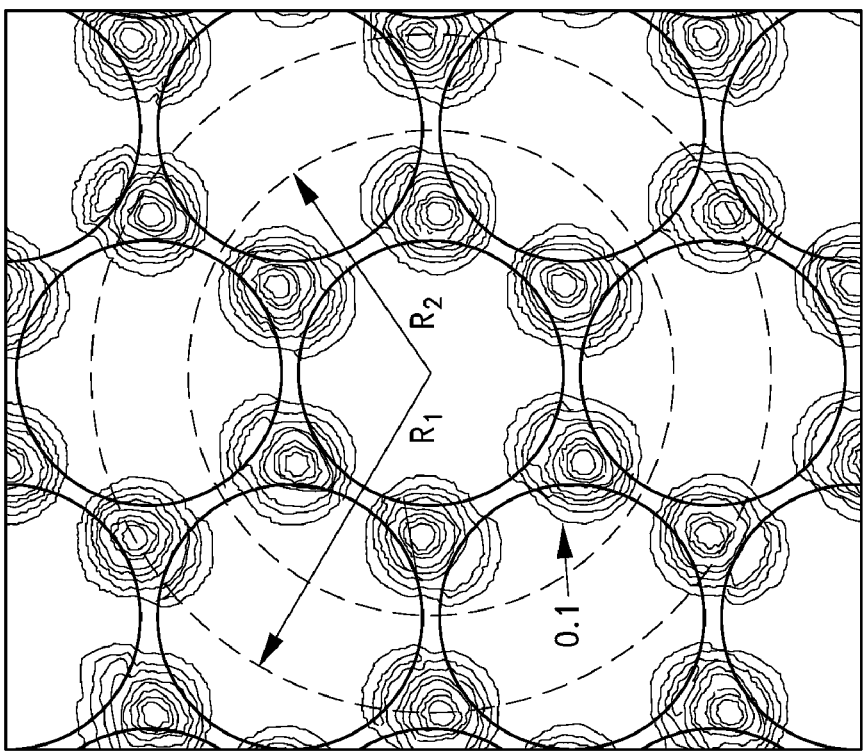

The foregoing determination of the radius R of the air core can be performed in accordance with a method of numerically computing the intensity distribution of the bulk modes of the infinite fiber cladding. In accordance with the method, the intensity distribution of the highest frequency bulk mode of the fiber of interest without the air core is first determined. Thereafter, a circular air core of radius R is superposed on that intensity distribution. As illustrated in FIGS. 15A and 15B, changing the core radius R causes the edge of the core to pass through different areas of this field distribution. In accordance with the computing method, the fiber will support surface modes when the edge of the core intersects high lobe regions of this field distribution. In FIGS. 15A and 15B, a core of radius $R=R_1$ is one example of a core radius that passes through several (six in this example) high intensity lobes of the highest frequency bulk mode. The computing method predicts that a core with such a radius will support surface modes. At the other extreme, when the core has a radius $R=R_2$, as illustrated in FIGS. 15A and 15B, the core edge does not pass through any of the high-intensity lobes of the bulk mode, and such a core of radius $R_2$ does not support surface modes.

Although, described in connection with a circular core, it should be understood that the foregoing method is not limited to circular cores, and the method is applicable to any core shape.

As described above, the computing method is qualitative. In accordance with the method, if the edge of a core of a selected radius R intersects high intensity lobes of the bulk mode, the fiber having a core of that radius will support surface modes. As described thus far, the method does not stipulate how many surface modes are supported. Furthermore, the method does not specify how high an intensity must be intersected by the edge of the core or how many high intensity lobes the edge of the core must intersect before surface modes appear (i.e., are supported).

The HFBM criterion is advantageously simplified by recognizing that the intensity lobes of the HFBM are nearly azimuthally symmetric, as shown in FIG. 5. Thus, the portion of each lobe confined in a dielectric corner 110 can be approximated by the circle 114 inscribed in the corner 110, as illustrated in FIG. 2. As discussed above, the radius α of the inscribed circle 114 is related to the period Λ and radius ρ of the holes 104 of the triangular pattern by $\alpha=(\Lambda/\sqrt{3})-\rho$.

Figure 16:
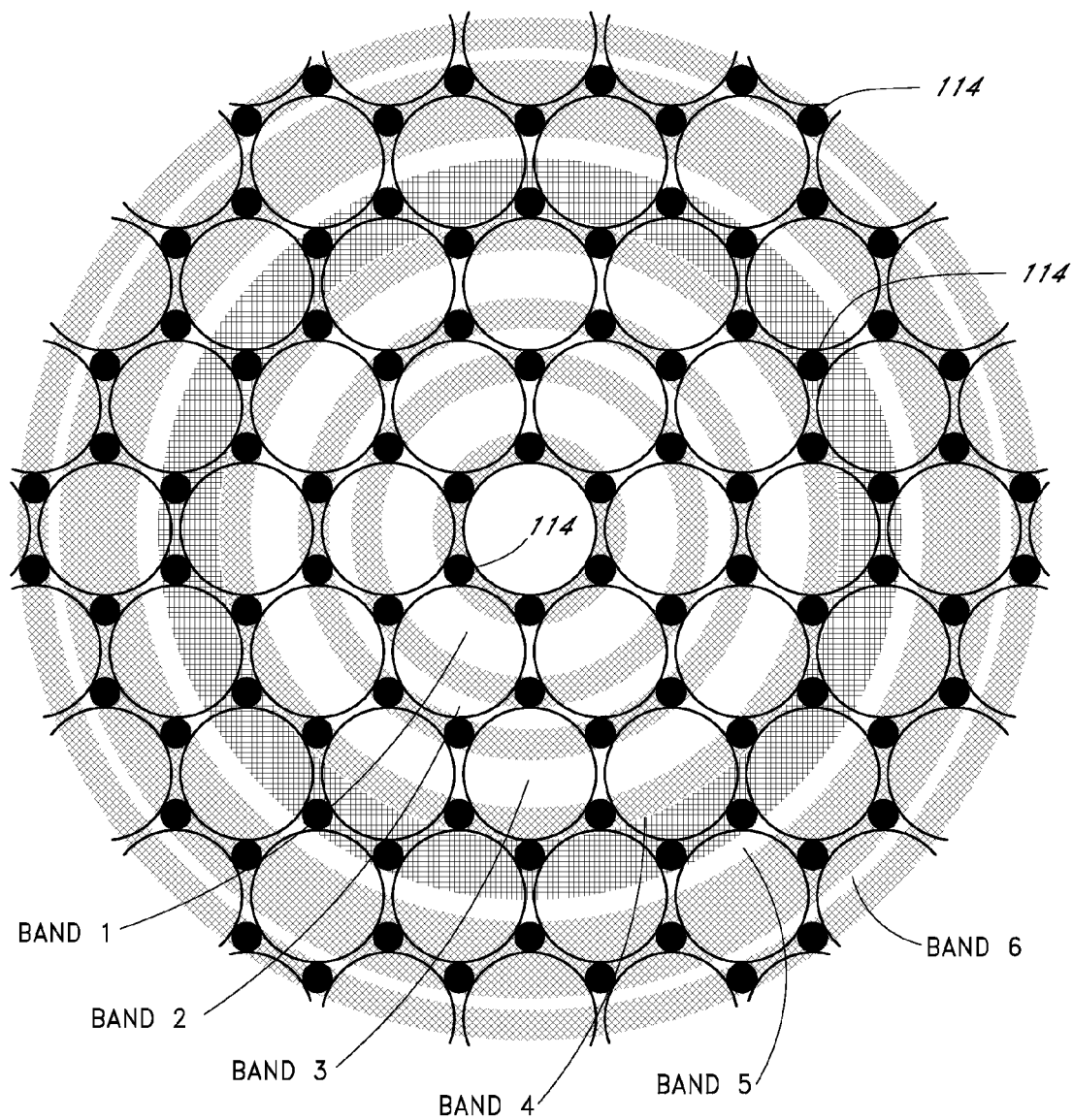
FIG. 16 illustrates a graphical representation of a partial cross section of the triangular pattern air core PBF, wherein black circles at each dielectric corner represent dielectric rods, and wherein unshaded rings represent bands of core radii for which the surface of the core does not intersect the dielectric rods.

The portions of the HFBM confined to the dielectric are approximated by a two-dimensional array of circles 114 centered on all the photonic-crystal corners 110, as illustrated in FIG. 16, which is plotted for a triangular pattern and ρ=0.47 Λ. This approximation enables a new, simpler existence criterion to be formulated for surface modes: surface modes exist when and only when the surface of the core 106 intersects one or more of the circles 114. Of course, many other kinds of perturbations can induce surface modes in the photonic crystal 102, so that the foregoing condition for the absence of surface modes is a necessary condition but it is not always a sufficient condition.

The same geometric criterion can also be derived using coupled-mode theory. In view of the symmetry of the lower-band bulk modes, each corner 110 can be approximated by a dielectric rod inscribed in the corner 110, wherein the rod extends the length of the PBF 100. Each isolated rod is surrounded by air and constitutes a dielectric waveguide. The dielectric waveguide carries a fundamental mode with strong fields in the rod that decay evanescently into the surrounding air, so the field looks much like the individual lobes of the HFBM illustrated in FIG. 5. Thus, the periodic array of rods has the pattern of the circles 114 illustrated in FIG. 16. The waveguide modes of the individual rods are weakly coupled to each other due to the proximity of neighboring rods and form the bulk modes.

The HFBM is just one particular superposition of individual waveguide modes. If an air core 106 that cuts into one or more rods is introduced, the removal of dielectric perturbs the waveguide modes in the opposite direction to that forming bulk modes. The waveguide modes of the ring of perturbed rods intersected by the surface of the core 106 are then coupled to each other and form a surface mode. This surface mode is supported by the ring of rods and has fields that decrease outside each rod, as evidenced by the exemplary surface mode of FIG. 3. If the surface of the core 106 cuts only through membranes 112 instead of corners 110, the rods are unperturbed, and the modes couple to each other much as they did without the presence of the core 106. Thus, no surface mode is formed. In accordance with this description, surface modes exist if and only if the surface of the core 106 intersects rods. This is the same criterion that was derived above by approximating the HFBM lobes by the inscribed circles 114.

To verify the validity of this new geometric criterion, the criterion is applied to the most widely studied class of air-core PBFs, namely fibers with circular air holes in a triangular pattern, as illustrated in FIG. 16. The core 106 is a larger circular air hole of radius R at the center of the fiber 100. Again, this analysis postulates that when R is selected so that the surface of the core 106 intersects one or more rods (e.g., the circles 114 in FIG. 16), then surface modes will exist, and the number of surface modes will be proportional to the number of rods intersected. This scaling law is expected because as the number of intersected rods increases the perturbation magnitude increases and the number of surface modes also increases. Conversely, when the surface of the core 106 does not intersect any rods, no surface modes occur. A simple diagram of the fiber cross section, such as the diagram illustrated in FIG. 16, makes the application of this criterion to any fiber geometry very easy.

The result of the foregoing geometric analysis is graphed in FIG. 16 for a triangular pattern. The shaded (cross hatched) rings in FIG. 16 represent the ranges of core radii that intersect rods and thus support surface modes. As discussed above with respect to FIG. 11, the unshaded rings between the shaded rings (band 1-band 6) represent ranges of radii that intersect no rods and thus do not support surface modes. The dependence of the number of surface modes on the core radius is calculated straightforwardly by applying elementary trigonometry to FIG. 16 to determine the number of rods crossed by the surface of a core 106 of a given radius. The numbers are plotted as a solid curve in FIG. 17, wherein the horizontal axis of the graph is the core radius normalized to the crystal period Λ (e.g., R/Λ), and wherein the left vertical axis represents the number of rods intersected by the surface of the core, as predicted by the geometric criterion.

Figure 17:
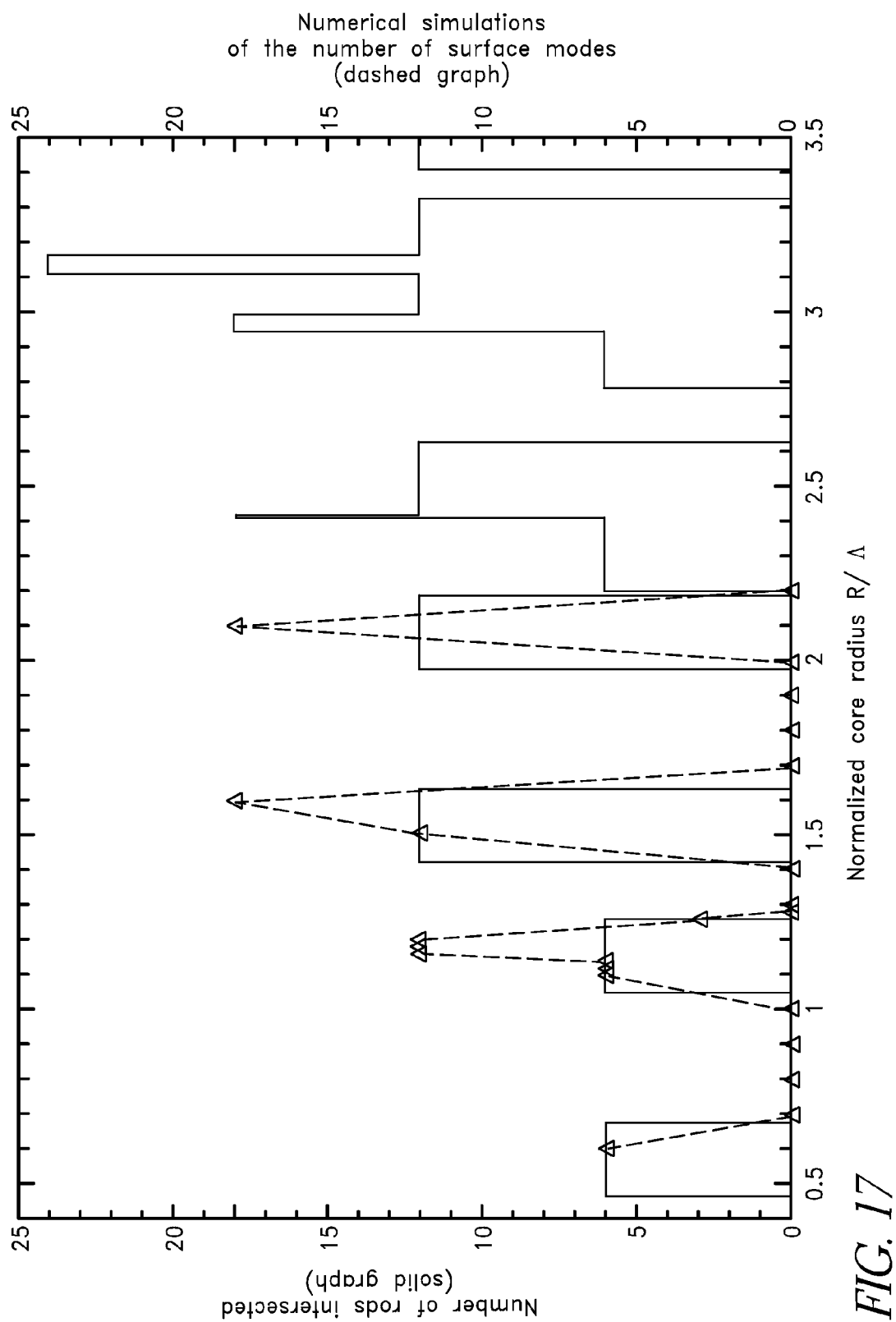
FIG. 17 illustrates a graph (dashed lines) of the results of the numerical simulations of the number of surface modes and illustrates a graph (solid lines) of the number of surface modes predicted using the geometric model of FIG. 16 and counting the number of rods intersected by the surface of the core, wherein the number of surface modes in each graph is plotted with respect to the normalized core radius R/$\Lambda$.

The simple postulate predicts the important result illustrated in FIG. 17 that several bands of radii for this type of PBF 100 support no surface modes at all across the entire bandgap. Six such bands occur in the range covered in FIG. 17 for radii R up to 3.5 Λ, where Λ is the crystal period as defined above. The range in FIG. 17 does not encompass the band below R=0.47 Λ, for which the radii are too small to support a core mode. Although not shown in FIG. 17, another eight bands occur for radii larger than 3.5 Λ. The last band is at R approximately equal to 8.86 Λ.

Table 1 lists the boundaries and the widths of 14 bands of core radii that support no surface modes in triangular PBFs with ρ=0.47 Λ. As shown in Table 1, the first band is the widest. The first band is also the most important for most purposes because the first band is the only band that falls in the single-mode range of this PBF 100 (e.g., in the range where R is less than about 1.2 for an air-hole radius ρ equal to 0.47 Λ). All other bands, except for the third one, are substantially narrower. Generally, the bands where no surface modes are supported become narrower as the radius of the core 106 increases. Note that by nature of the rod approximation, these values are independent of the refractive index of the photonic crystal lattice dielectric 102.

TABLE 1

| Band No. | Range from geometric criterion (in units of Λ) | Range from HFBM criterion (in units of Λ) | Range from simulations (in units of Λ) | Width of Band (in units of Λ) |
| --- | --- | --- | --- | --- |
| 1 | 0.685-1.047 | 0.68-1.05 | 0.65 ± 0.05-1.05 ± 0.05 | 0.363 |
| 2 | 1.262-1.420 | 1.26-1.43 | 1.27 ± 0.01-1.45 ± 0.05 | 0.158 |
| 3 | 1.635-1.974 | 1.64-1.97 | 1.65 ± 0.05-2.05 ± 0.05 | 0.339 |
| 4 | 2.189-2.202 | | | 0.013 |
| 5 | 2.624-2.779 | | | 0.155 |
| 6 | 3.322-3.405 | | | 0.083 |
| 7 | 3.619-3.679 | | | 0.059 |
| 8 | 3.893-3.934 | | | 0.071 |
| 9 | 4.271-4.402 | | | 0.131 |
| 10 | 5.239-5.400 | | | 0.161 |
| 11 | 6.218-6.244 | | | 0.026 |
| 12 | 6.914-6.916 | | | 0.0022 |
| 13 | 7.875-7.914 | | | 0.039 |
| 14 | 8.844-8.856 | | | 0.0113 |

To evaluate the accuracy of the foregoing quantitative predictions, numerical simulations of the surface modes of this same class of PBFs were conducted on a supercomputer using a full-vectorial plane wave expansion method, as discussed above. The dielectric was defined to be silica and the radius ρ of the air-holes 104 was defined to be equal to 0.47 Λ. The results of the simulations are plotted in FIG. 17 as open triangles joined by dashes, wherein the right vertical axis represents the number of surface modes predicted by the numerical simulations. Note that this curve of triangular points is exactly the same as the curve of triangular points of FIG. 9. The agreement with the predictions of the geometric criterion (plotted as a solid curve in FIG. 17) is excellent. This agreement is further apparent by comparing the information in the second column of Table 1 for the boundary values of the first three surface-mode-free bands generated by the geometric criterion with the information in the fourth column of Table 1 for the boundary values produced by the simulations. The geometric criterion produces values that are within 5% of the values produced by the simulations. Note that the exact boundary radii produced by the simulations were computed in limited numbers (e.g., for the radii encompassing the first three surface-mode-free bands) and were computed with a limited number of digits because the simulations are very time consuming (e.g., about six hours per radius). In contrast, the geometric criterion provided far more information in a small amount of time. Also note that although the geometric criterion does not accurately predict the exact number of surface modes (see FIG. 17), the geometric criterion does exhibit the correct trend. In particular, the geometric criterion predicts that surface modes generally become more numerous with increasing radius R of the core 106, which is consistent with the original hypothesis.

Figure 18:
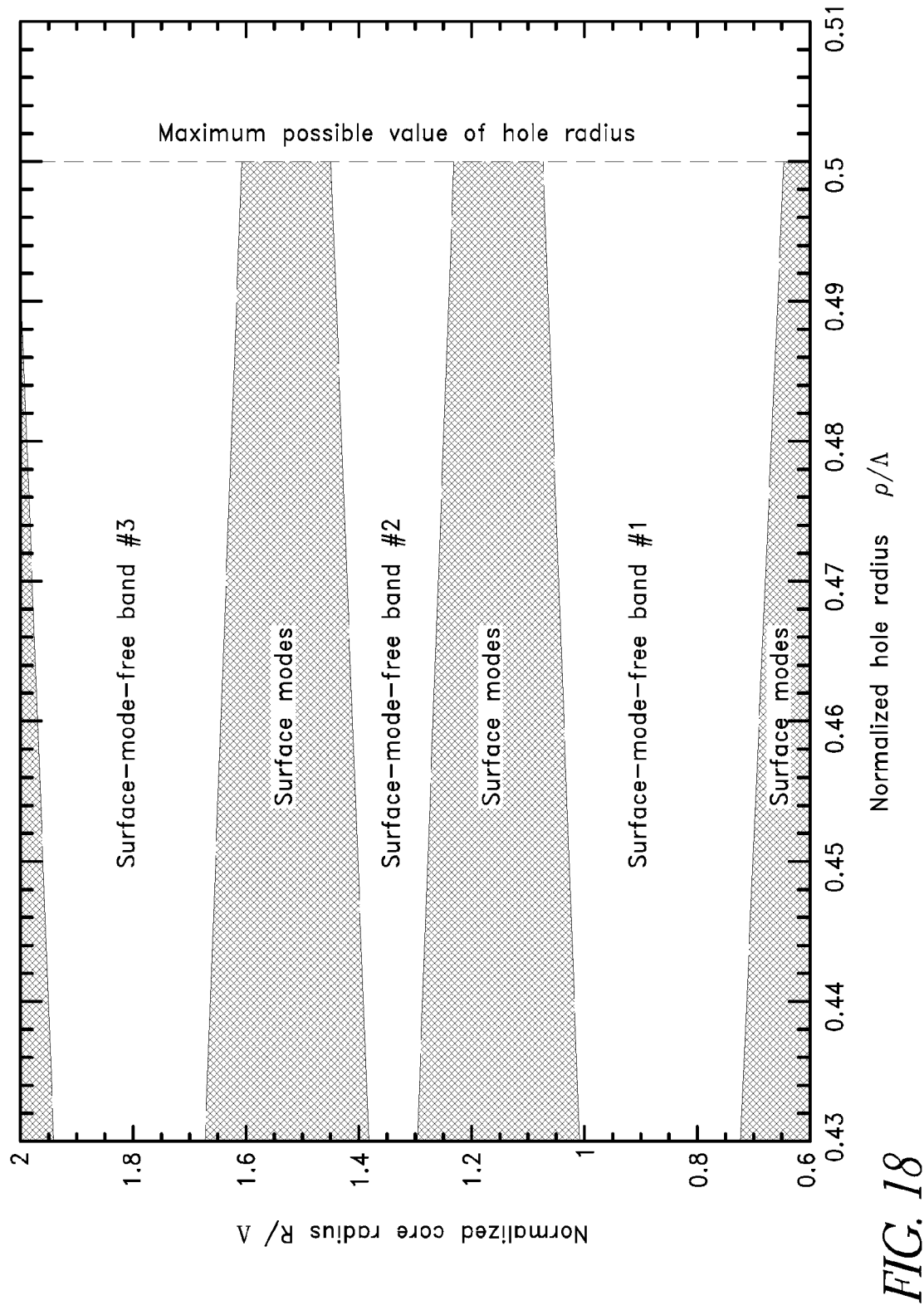
FIG. 18 illustrates a plot of the normalized core radius R/$\Lambda$ versus the normalized hole radius $\rho$/$\Lambda$ to show the effect of the fiber air-filling ratio on the presence of surface modes.

The effect of the fiber air-filling ratio on the presence of surface modes can also be quickly evaluated with the above-described geometric criterion by simply recalculating the boundary radii for different values of the hole radius ρ. The results of the calculations are illustrated in FIG. 18, which plots the normalized boundary core radius R/Λ, from R/Λ=0.6 to R/Λ=2.0, on the vertical axis versus the normalized hole radius ρ/Λ, from ρ/Λ=0.43 to ρ/Λ=0.50, on the horizontal axis. The possible values for ρ are constrained between approximately 0.43 Λ, below which the photonic crystal has no bandgap, and below approximately 0.50 Λ, at which the thickness of the membranes 112 becomes zero. The ranges of core radii versus hole radii that support surface modes are shaded (cross hatched) and the ranges of core radii that do not support surface modes are unshaded. FIG. 18 shows that larger holes 104, which have greater air-filling ratios, yield wider surface-mode-free bands because increasing the radius ρ of the air-holes 110 decreases the radius α of the rods (represented by the inscribed circles 114). Because of the smaller rod size, the ranges of core radii R that intersect the rods are narrower, and the bands of surface-mode-free radii become wider.

Other interesting observations can be obtained from the results of the studies described above. First, in experimental PBFs 100, the core 106 is typically created by removing the central seven tubes or the central nineteen tubes from the preform. These configurations correspond to core radii R of approximately 1.15 Λ and approximately 2.1 Λ, respectively. The geometric criterion defined herein confirms the predictions of exact simulations that both of these configurations exhibit surface modes, as shown, for example, in FIG. 17. The existence of the surface modes explains, at least in part, the high propagation loss of most photonic-bandgap fibers fabricated to date.

Second, the simulated curve in FIG. 17 shows that a small change in core radius is all it takes to go from a surface-mode-free PBF to a PBF that supports surface modes. The abruptness of the transitions is consistent with the perturbation process that creates surface modes, and supports the credibility of the rod approximation discussed above.

Third, the trends in Table 1 discussed earlier can be explained with simple physical arguments. As the core radius increases, adjacent concentric layers of rods become closer to each other, as shown in FIG. 16. For larger radii, it is increasingly more difficult to find room for a circular radius that avoids all rods. Also, a larger radius tends to intersect more rods, and thus the number of surface modes generally increases. A manifestation of this effect can readily be seen in the fifth and sixth layers of rods, which lie between band 4 and band 5 in FIG. 16. The fifth and sixth layers overlap radially and thus merge into a single, wider zone of core radii that support surface modes. In other words, there is no surface-mode-free band between the fifth and sixth layers of rods. The same effect occurs with respect to the seventh, eighth and ninth layers, which lie between band 5 and band 6 in FIG. 16 and cause the large numerical difference between the maximum radius of band 5 (R=2.779 Λ) and the minimum radius of band 6 (R=3.322 Λ) in Table 1. Conversely, as the radius R of the core 106 increases, the surface-mode-free bands become increasingly narrower, as can readily be seen in the fifth column of Table 1, which lists the width of each surface-mode-free band in units of Λ.

It can be expected intuitively that cores 106 with radii larger than some critical value $R_c$ will all support surface modes, and thus, only a finite number of surface-mode-free bands are available. This intuitive expectation is consistent with the results of Table 1. In particular, for the structure evaluated herein for a radius ρ of the holes 104 of 0.47 Λ, the number of surface-mode-free bands is limited (i.e., only 14 bands), and a critical radius $R_c$ (i.e., approximately 8.86 Λ) exists above which the surface modes form a continuum. As indicated by the values in Table 1, the last four surface-mode-free bands are so narrow (e.g., ΔR of a few percent of Λ) that the last four bands are probably unusable for most practical applications. A corollary of this observation is that multimode PBFs with the particular geometry illustrated herein and with a core radius R greater than 5.4 Λ will likely be plagued with surface modes.

The average value of the $1/e^2$ radius of any of the lobes of the actual bulk mode in FIGS. 15A and 15B is approximately 0.22 Λ. In comparison to the intensity lobe, the radius α of the inscribed (dashed) circle in FIG. 8 is approximately 0.107 Λ. A more refined figure and a better quantitative agreement can be obtained by refining the value of the equivalent radius α of the silica rod, and by calculating the average radius of the fundamental mode of a solid rod suspended in air.

Figure 19:
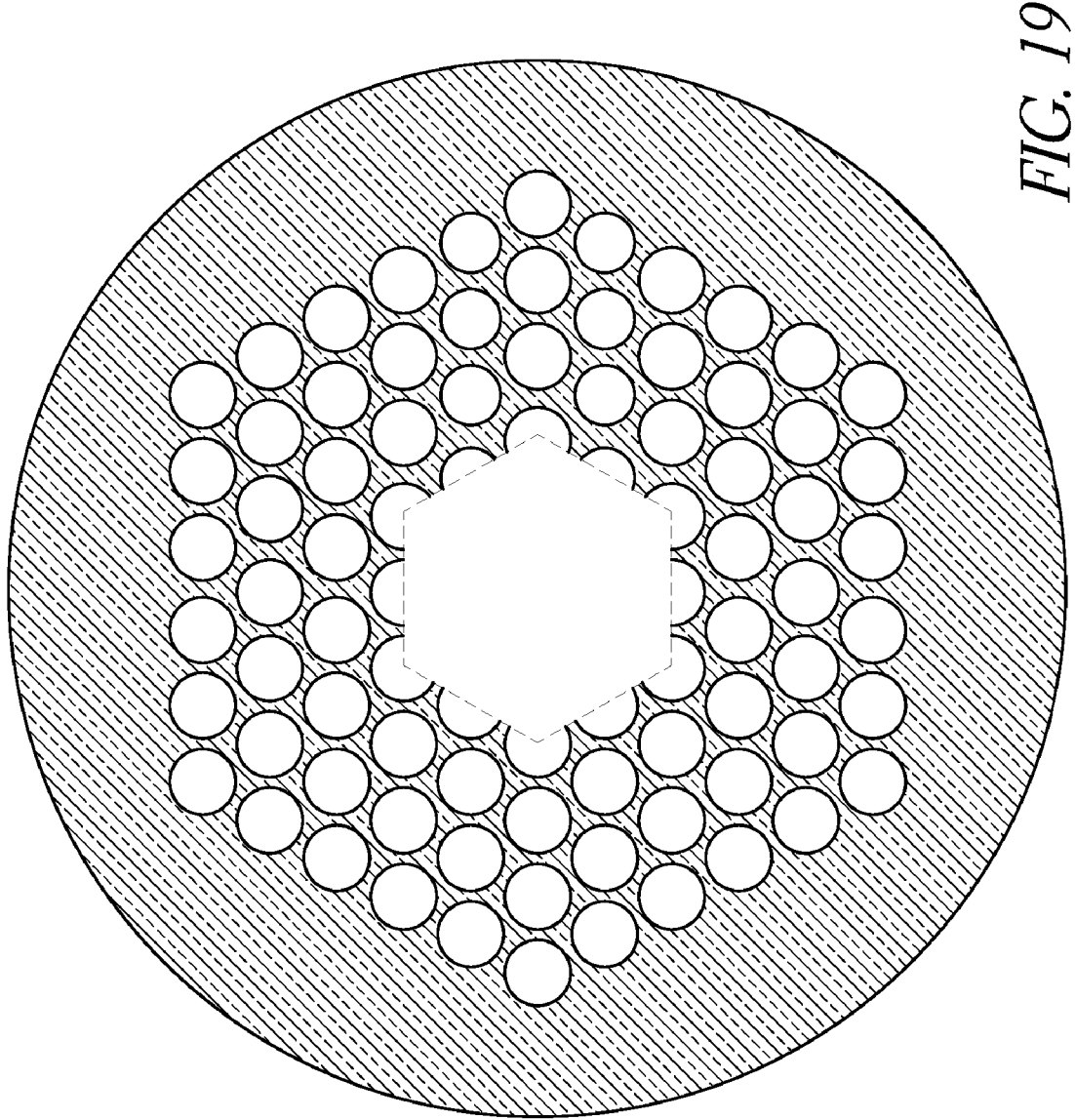
FIG. 19 schematically illustrates a cross section of an alternative air-core photonic bandgap fiber having a non-circular (e.g., hexagonal) core shape and no surface modes.

Another observation obtained from the study described herein is that surface modes can be avoided in principle for any core size by selecting a non-circular core shape having a surface that does not intersect any rods. A schematic of an example of a non-circular core having a characteristic dimension corresponding to the shortest distance from the center to the nearest boundary of the core is shown in FIG. 19. With a hexagon-shaped core (as outlined by a dashed line in FIG. 19 to assist in visualizing the shape of the core), the introduction of any surface mode is avoided even when the core region is large. Such a structure could represent an improvement over the above-described circular core structures in applications where multi-mode operation is desired.

The geometric criterion described herein is not limited to the particular triangular geometry with circular cladding holes and the circular cores. It is applicable to other shapes and geometries.

In accordance with the foregoing description, a simple geometric criterion quickly evaluates whether an air-core PBF exhibits surface modes. Comparison of the results of the geometric criterion to the results of numerical simulations demonstrates that when applied to fibers with a triangular-pattern cladding and a circular core, the geometric criterion accurately predicts the presence of a finite number of bands of core radii that support no surface modes. For sufficiently large circular cores (i.e., for radii above the largest of these bands), the fiber supports surface modes for any core radius. This versatile criterion provides an expedient new tool to analyze the existence of surface modes in photonic-crystal fibers with an arbitrary crystal structure and an arbitrary core profile.

Figure 20A:
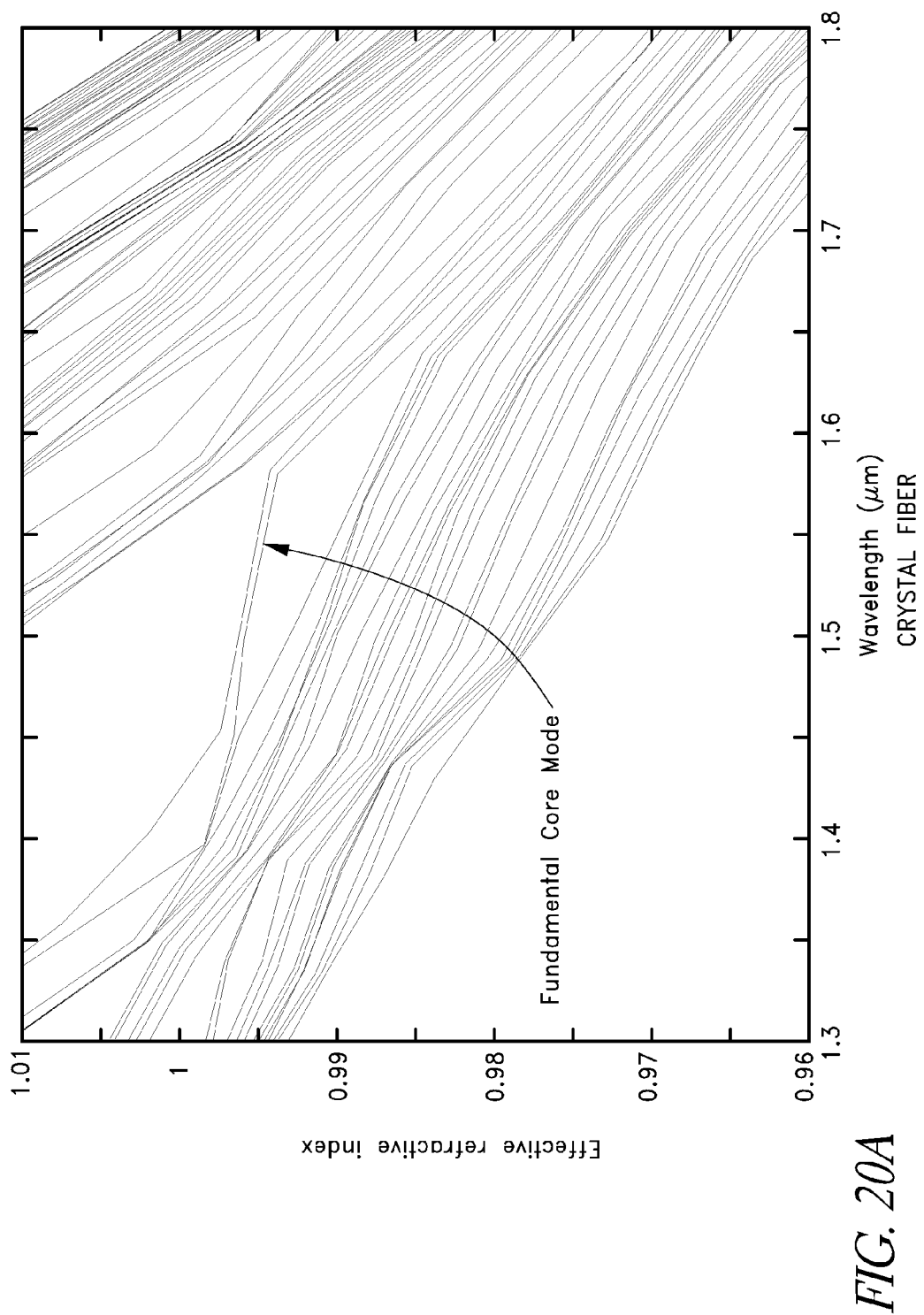
FIGS. 20A and 20B illustrate for comparison the effective refractive indices of core modes and surface modes for two commercially available photonic bandgap fibers.
Figure 20B:
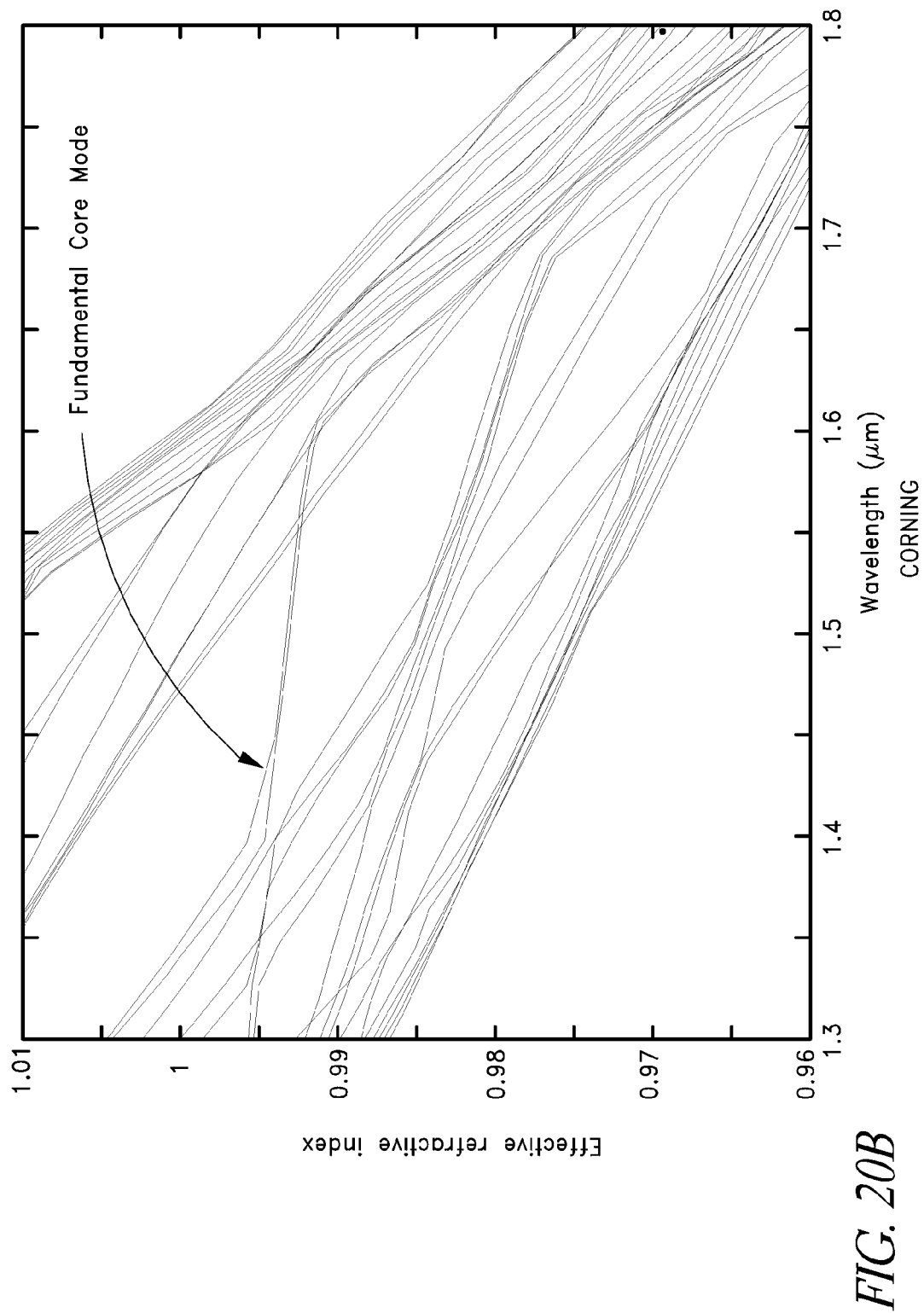

FIGS. 20A and 20B illustrate plots of the effective refractive indices of the modes as a function of wavelength. The plot in FIG. 20A illustrates indices of the fiber manufactured by Crystal Fibre. The plot in FIG. 20B illustrates the indices of the fiber manufactured by Corning. The plots were generated using numerical simulations. The fundamental core modes are shown in bold curves, and the less intense lines are the surface modes. The Crystal Fibre core mode (FIG. 20A) has a measured minimum loss of the order of 100 dB/km while the Corning core mode (FIG. 20B) has a measured minimum loss of 13 dB/km. The loss of the core mode is believed to be mainly due to coupling of the core mode to surface modes, which are inherently lossy due to the concentration of energy near the surface of the core. Hence surface modes suffer from enhanced Rayleigh scattering. The total power coupled from core modes to surface modes will be enhanced, and thus the loss will be larger, if the core supports a large number of surface modes. In addition, it is well known from coupled mode theory that the coupling of two modes, in this case the core mode to a surface mode, will be stronger when the effective refractive indexes of the two modes are closer.

When considering the modes at a wavelength of 1.50 μm in FIGS. 20A and 20B, it can be seen that there are far more surface modes in the Crystal Fibre structure (FIG. 20A) than in the Corning structure (FIG. 20B). Furthermore, the effective refractive indices of the Corning surface modes are less than 0.986, while the core mode has an effective refractive index of 0.994, a 0.8% difference. On the other hand, the core mode in the Crystal Fibre structure has an effective refractive index of 0.996, while the nearest surface mode has an effective refractive index of 0.994, only a 0.2% difference. Everything else being the same, in particular the level of geometrical perturbation present in the core of the two fibers, coupling of the core mode to surface modes is expected to be stronger in the fiber manufactured by Crystal Fibre. Thus, the Crystal Fibre fiber supports more surface modes, and the surface modes couple more strongly, which is consistent with the higher propagation loss of the Crystal Fibre fiber. From the foregoing, it can be concluded that to design air-guided PBFs with a low loss, the preferred approach is to completely eliminate surface modes, as described above. If it is not possible to completely eliminate the surface modes, a second approach is to reduce the number of surface modes (e.g., by assuring that the core does not cut through too many corners of the cladding lattice), to increase the effective index detuning between the core modes and the remaining surface modes, or both.

Photonic-Bandgap Fibers with Core Rings

The discussion above describes a detailed investigation of the existence of surface modes in particular types of PBFs 100. An example of a PBF that does not support surface modes is illustrated in FIG. 21A. The fiber cladding comprises a photonic crystal lattice 102 with holes 104 (e.g., holes filled with air) having substantially circular cross-sections and arranged in a triangular pattern in silica. The holes 104 have a period Λ, and each hole 104 has a hole radius ρ.

The fiber core 106 of FIG. 21A comprises an air-hole with a generally circular cross-section with a radius R and which is centered on one of the holes 104, as if a hole of radius R had been drilled into the fiber. As described above, simulations and physical explanations show that if the surface of the core 106 cuts through the thicker portions of the silica lattice 102 between three surrounding holes 104 (which are referred to as corners 110 in FIG. 21A), the core 106 will support surface modes. But if the surface of the core 106 intersects only the thinner portions of the lattice 102 between only two adjacent holes 104 (referred to as membranes 112 in FIG. 21A), the core 106 will be substantially free of surface modes. As described above, this criterion can be used to design air-core PBFs 100 that do not substantially support surface modes at any frequency in the bandgap and thus presumably fibers 100 that exhibit significantly lower losses.

Figure 21B:
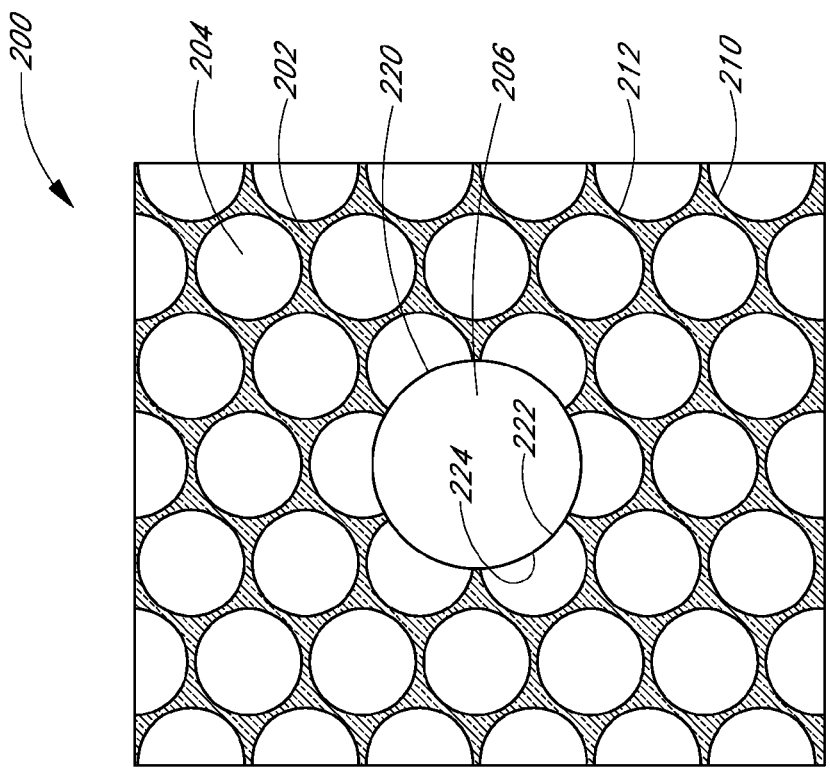
FIG. 21B illustrates a cross-section of an exemplary fiber similar to the fiber of FIG. 21A also having a central core of radius R=0.9 $\Lambda$, but with a thin silica ring around the core.
Figure 21A:
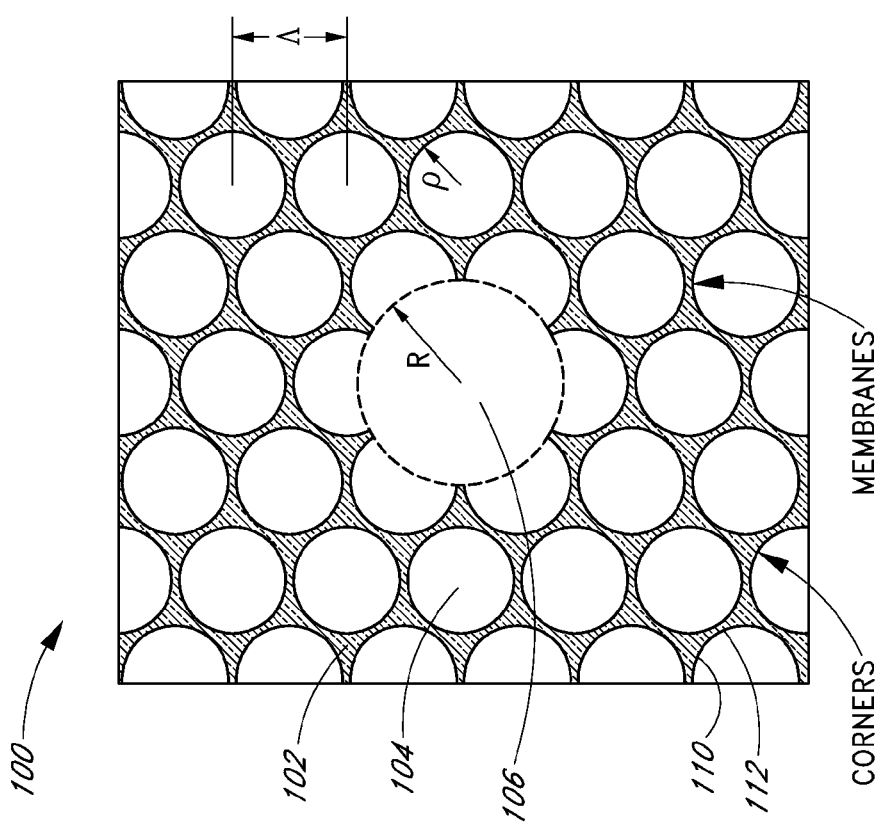
FIG. 21A illustrates a cross-section of an exemplary air-core photonic-bandgap fiber with a central core of radius R=0.9 $\Lambda$, such that the core does not support surface modes.

FIG. 21B illustrates an exemplary embodiment of a PBF 200 having the same general geometry as the PBF 100 of FIG. 21A. Besides comprising a lattice 202, a plurality of holes 204, and a core 206, the PBF 200 further comprises a core ring 220 surrounding the core 206. In certain embodiments, the core ring 220 extends along the PBF 200 and has a cross-sectional shape which generally surrounds the core 206. In certain embodiments, the ring 220 has an inner perimeter and an outer perimeter which are generally parallel to one another along the length of the PBF 100, along an azimuthal direction around an axis of the PBF 100, or both. In certain other embodiments, the inner perimeter and the outer perimeter are not parallel to one another along the length of the PBF 100, along an azimuthal direction around an axis of the PBF 100, or both. In certain embodiments, the core ring 220 has a thickness which is generally constant along the length of the PBF 100, along an azimuthal direction around an axis of the PBF 100, or both. In certain embodiments, the core ring 220 has a thickness which varies along the length of the PBF 100, along an azimuthal direction around an axis of the PBF 100, or both.

The lattice 202 of FIG. 21B has corners 210 and membranes 212, as described above. As described more fully below, computer simulations of a PBF 200 having a thin core ring 220 provide information regarding the effects of the thin core ring 220 surrounding the core 206 of the PBF 200 and regarding the existence of surface modes. These simulations show that the addition of even a very thin silica ring 220 (e.g., a thickness of approximately 0.03 Λ) introduces surface modes. These surface modes have main maxima centered on the open segments of the ring 220, and the dispersion curves of these surface modes lie between the upper band edge of the photonic bandgap and the light line. These features indicate that these surface modes are the guided modes of the ring 220 surrounded by air within an inner perimeter 222 of the ring 220 and the photonic crystal lattice 202 outside an outer perimeter 224 of the ring 220. The presence of a ring 220 also induces small distortions and decreased group velocity dispersion in the fundamental core mode, and also induces a small frequency down-shift. The intensity distributions of the ring surface modes suggest that the ring surface modes also introduce substantial losses to the core mode, a postulate which is strongly supported by published experimental evidence. The propagation loss of air-core fibers may be reduced by various techniques, including but not limited to, (i) fabricating fibers without a core ring (as described above); (ii) keeping the ring 220 but selecting the radius of the ring 220 towards the upper end of the single-mode range (e.g., R<~1.2 Λ) to increase the detuning between the core 206 and the surface modes; (iii) reducing the ring thickness to reduce the number of ring surface modes; or (iv) a combination of these actions.

In certain embodiments, a photonic bandgap fiber (PBF) has a cladding photonic crystal region comprising a triangular lattice composed of a plurality of holes in silica, where the holes have substantially circular cross-sections and are spaced apart by a period Λ. Certain such PBFs, in which the holes are filled with air, are described, for example, in R. F. Cregan et al., *Single-Mode Photonic Band Gap Guidance of*

*Light in Air, Science*, Vol. 285, 3 Sep. 1999, pages 1537-1539; Jes Broeng et al., *Analysis of air guiding photonic bandgap fibers, Optics Letters*, Vol. 25, No. 2, Jan. 15, 2000, pages 96-98; and Jes Broeng et al., *Photonic Crystal Fibers: A New Class of Optical Waveguides, Optical Fiber Technology*, Vol. 5, 1999, pages 305-330, which are hereby incorporated herein by reference.

Figure 22:
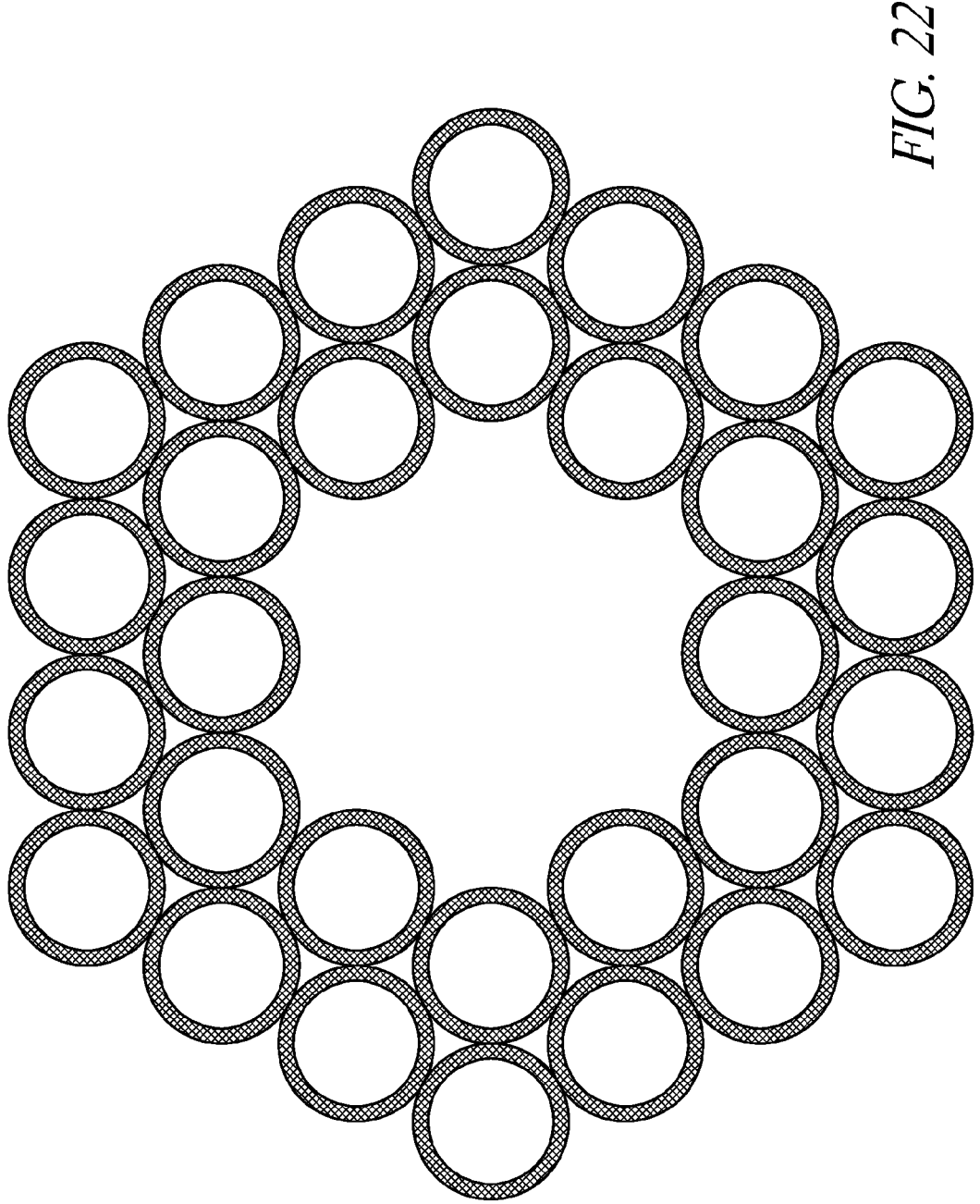
FIG. 22 illustrates a cross-section of a generic preform for an air-core photonic-bandgap fiber, wherein the preform comprises a stack of silica tubes with seven center tubes removed to form the single-mode core of the fiber.

In practice, the cross-sectional profile of an air-core fiber is somewhat different from the cross-sectional profile shown in FIG. 21A. The PBF of certain embodiments is drawn from a preform made of silica capillary tubes stacked in a hexagonal arrangement, and a few tubes are removed from the center of the stack to form the core. For example, to produce a typical single-mode core, seven tubes are removed, as illustrated in FIG. 22. During the process of drawing of a fiber from the preform, surface tension pulls on the softened glass walls of the tubes to cause the original scalloped outline of the core shown in FIG. 22 to become a smooth thin ring of silica. Such a core ring is a standard feature of current commercial air-core PBFs, as described, for example, in Dirk Müller et al., *Measurement of Photonic Band-gap Fiber Transmission from 1.0 to 3.0 μm and Impact of Surface Mode Coupling*, Proceedings of Conference on Laser and Electro-Optics (CLEO) 2003, Baltimore, USA, 1-6 Jun. 2003, paper QTuL2, 2 pages; B. J. Mangan et al., *Low loss (1.7 dB/km) hollow core photonic bandgap fiber*, Conference on Optical Fiber Communications, OFC 2004, Los Angeles, Calif., Feb. 22-27, 2004, Postdeadline Paper PDP24, 3 pages; and Theis P. Hansen et al., *Air-Guiding Photonic Bandgap Fibers: Spectral Properties, Macrobending Loss, and Practical Handling, IEEE Journal of Lightwave Technology*, Vol. 22, No. 1, January 2004, pages 11-15, which are hereby incorporated herein by reference.

The presence of a ring at the edge of the core introduces new boundary conditions that did not exist in the fiber geometry discussed above with regard to the photonic-bandgap fiber with no core ring. Consequently, new sets of surface modes are expected to be present in a ringed air-core fiber. As described below, computer simulations confirm that a core ring does introduce surface modes, even when the ring is relatively thin. In certain embodiments, the ring thickness for the air-core PBF is less than $0.03\Lambda$, where $\Lambda$ is the period of the crystal, while in other embodiments, the ring thickness is less than $0.02\Lambda$, and in still other embodiments, the ring thickness is less than $0.01\Lambda$. The surface modes are found to be the guided modes of the ring itself. The ring is surrounded by the material filling the core (e.g., air) on its inside and by the photonic crystal on its outside and acts as a waveguide. The ring also induces small but noticeable perturbations of the fundamental core mode, including intensity profile distortions, increased group-velocity dispersion, and frequency down-shift. For certain photonic-bandgap fibers, these ring surface modes can introduce substantial propagation loss of core modes. As described herein, computer simulations advantageously provide information to better understand the behavior of these surface modes and to configure the photonic-bandgap fiber to reduce or eliminate the surface modes in order to further reduce the losses of the air-core fibers.

In certain embodiments, a photonic-bandgap fiber 200 comprises a photonic crystal lattice 202 comprising a first material (e.g., silica) with holes 204 filled with a second material (e.g., air) having a refractive index smaller than that of the first material. In certain embodiments, the holes 204 each have a radius $\rho=0.47\Lambda$ and are arranged in a triangular pattern, as illustrated in FIG. 21B. A larger hole comprising the second material and having a radius R is added to this structure to break its symmetry and to form the central core 206. In a first set of simulations, the effects of a thin silica ring 220 at the periphery of the core 206 are investigated.

In FIGS. 21A and 21B, the core radius is $R=0.9\Lambda$. In certain embodiments, this particular value for the core radius is selected so that the surface of the core 206 cuts only through membranes 212 of the cladding lattice 202, as is readily apparent in FIG. 21B. As described above, in the absence of the thin silica ring 220, the PBF of certain embodiments supports no surface modes. The ring 220 in FIG. 21B has an inner radius $R_1=0.9\Lambda$ and has a small thickness of $0.03\Lambda$. Thus, the ring 220 illustrated by FIG. 21B has an outer radius $R_2=0.93\Lambda$.

The bulk modes, core modes, and surface modes of the fibers 100, 200 shown in FIGS. 21A and 21B were calculated numerically on a supercomputer using a full-vectorial plane wave expansion method. See, for example, Steven G. Johnson et al., *Block-iterative frequency-domain methods for Maxwell's equations in a planewave basis, Optics Express*, Vol. 8, No. 3, 29 Jan. 2001, pages 173-190, which is hereby incorporated herein by reference. A supercell size of 10×10 and a grid resolution of $\Lambda/16$ were used for the calculations.

Figure 23A:
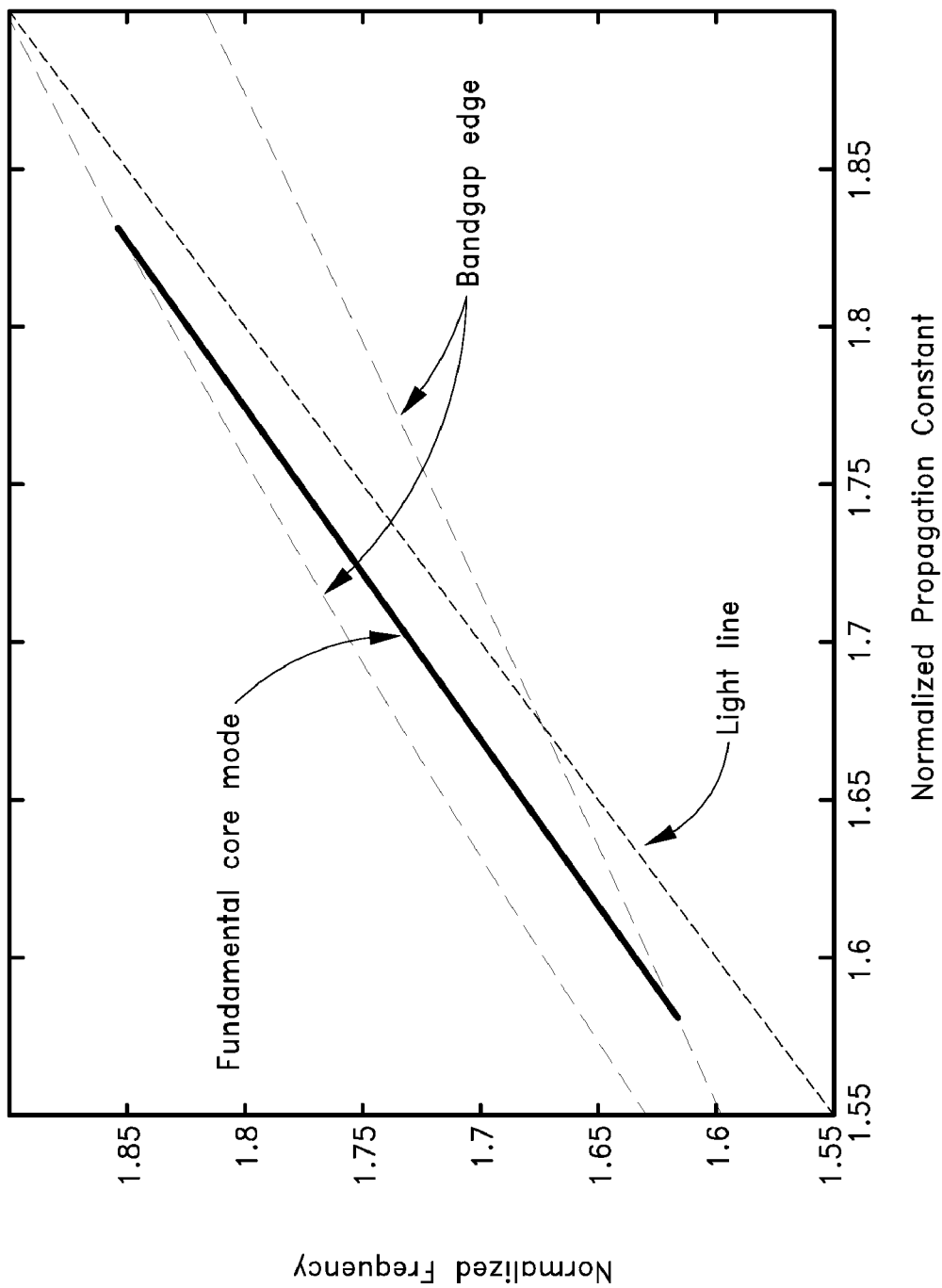
FIG. 23A illustrates a calculated $\omega$-k diagram of the air-core fiber of FIG. 21A, which does not have the thin silica ring around the central core.

FIG. 23A illustrates a calculated ω-k diagram of the fiber 100 when the core 106 is not surrounded by a ring (e.g., the fiber 100 shown in FIG. 21A). The dashed curves in FIG. 23A represent the edges of the fiber bandgap. As described above, for the radius $R=0.9\Lambda$, the core 106 supports only the fundamental mode (which is in fact two-fold degenerate in polarization).

Figure 23B:
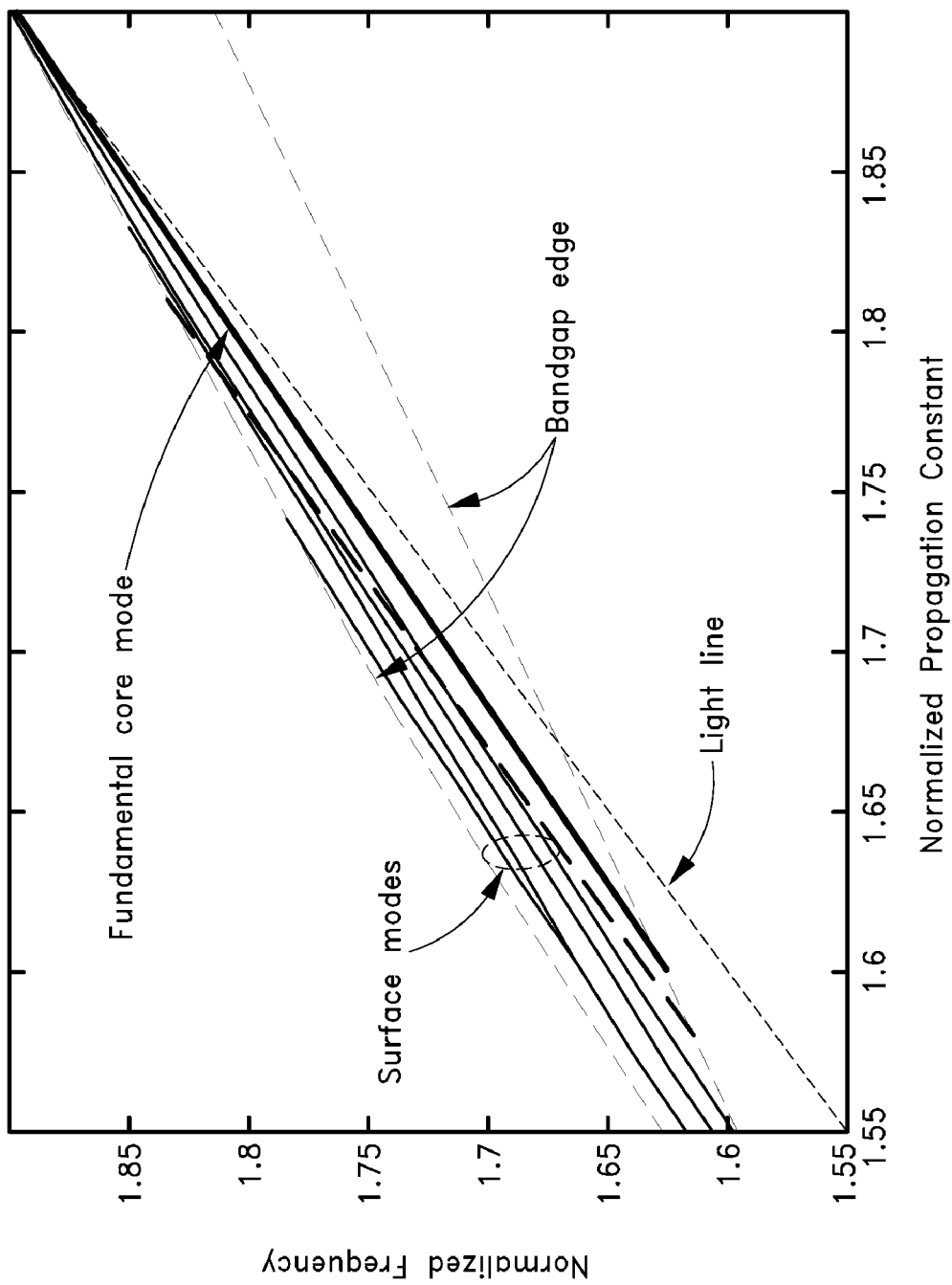
FIG. 23B illustrates a calculated $\omega$-k diagram of the air-core fiber of FIG. 21B, which has the thin silica ring around the central core.

When the thin core ring 220 is added as shown in FIG. 21B, two main changes occur in the dispersion diagram, which are shown in FIG. 23B. First, as illustrated by a solid curve in FIG. 23B, the dispersion curve of the fundamental mode shifts towards lower frequencies. By comparing the dispersion curve with the ring 220 of FIG. 23B with the dispersion curve without the ring of FIG. 23A (reproduced as a dashed curve in FIG. 23B), the shift towards lower frequencies is apparent.

Figure 24B:
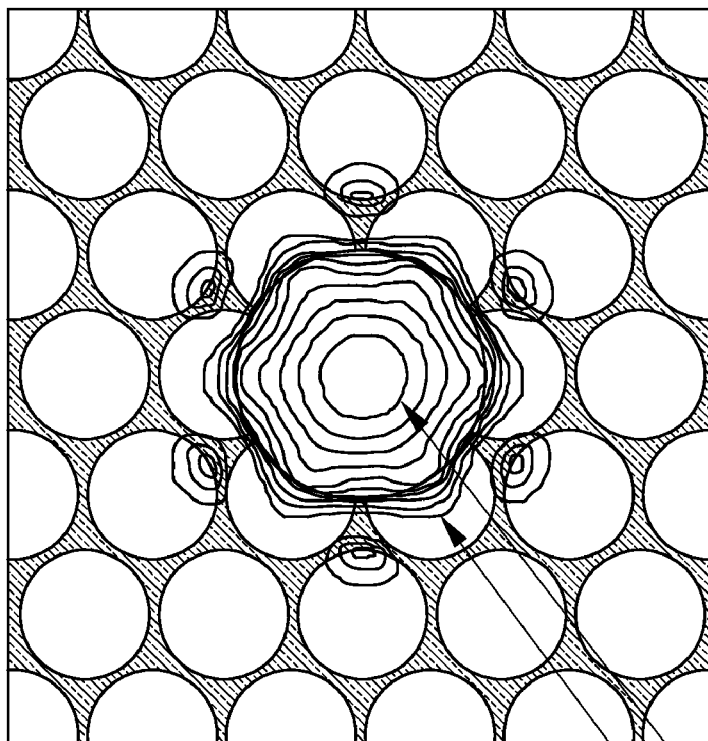
FIG. 24B illustrates intensity contour lines of the fundamental core mode of the air-core fiber of FIG. 21B (ring around the core) also calculated at $k_z\Lambda/2\pi=1.7$, wherein the relative intensity on the contours varies from 0.1 to 0.9 in increments of 0.1.
Figure 24A:
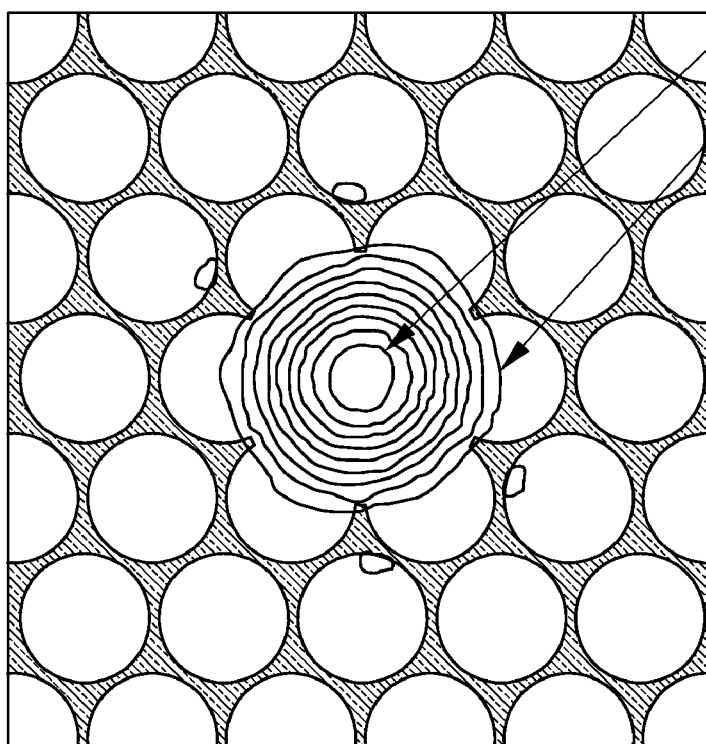
FIG. 24A illustrates intensity contour lines of the fundamental core mode of the air-core fiber of FIG. 21A (no ring around the core) calculated at $k_z\Lambda/2\pi=1.7$, wherein the relative intensity on the contours varies from 0.1 to 0.9 in increments of 0.1.

The intensity profiles of the fundamental modes of the fiber 100 calculated without the ring are plotted in FIG. 24A. The intensity profiles of the fundamental modes of the fiber 200 with the ring 220 are plotted in FIG. 24B. Without a ring (FIG. 24A), the fundamental mode is strongly localized to the core region. When the ring 220 is added (FIG. 24B), the fundamental mode exhibits radial ridges with a six-fold symmetry. The ridges are caused by the ring 220 having a higher refractive index than the air in the core 206, so that the ring 220 acts as a local guide and pulls some of the mode energy away from the center of the core 206. Because a slightly higher fraction of the mode energy is now contained in the silica ring 220, the mode is slowed down a little, which explains the down-shift in its dispersion curve shown in FIG. 23B. The group velocity of the fundamental mode is also decreased.

Figure 25B:
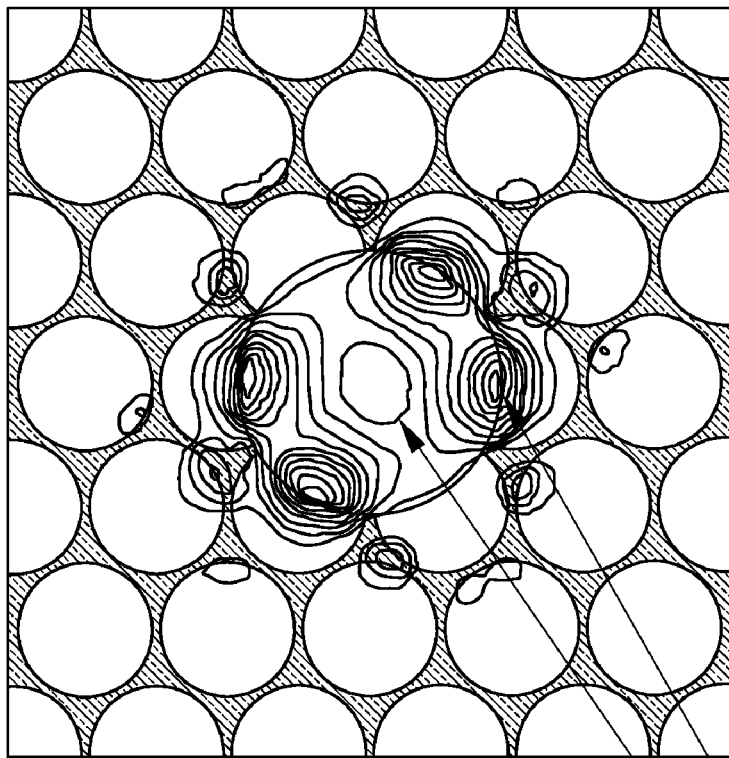
FIGS. 25A and 25B illustrates the intensity contour lines of two exemplary surface modes of the fiber of FIG. 21B to illustrate the effect of the thin silica ring around the core.
Figure 25A:
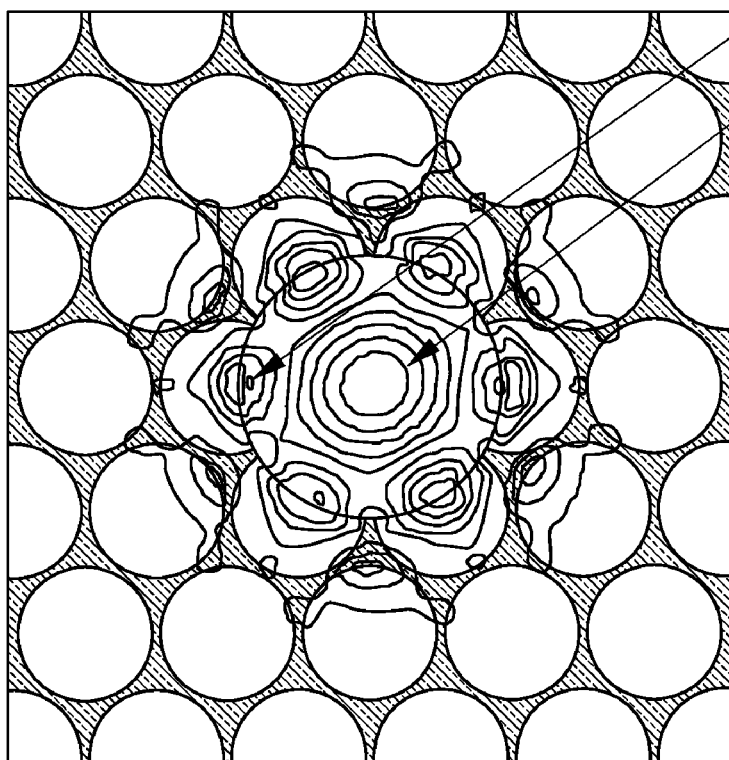

The second change in the dispersion curve shown in FIG. 23B is the appearance of five new modes (three non-degenerate and two degenerate, shown as dotted curves in FIG. 23B). The intensity profiles of two of these modes illustrated in FIGS. 25A and 25B show that they are surface modes. Both intensity profiles in FIGS. 25A and 25B exhibit narrow maxima centered on open segments of the ring which decay sharply into the air on both sides of these segments. (As used herein, an "open segment" of the ring is a portion of the ring spanning between two membrane portions cut by the formation of the core.) The existence of such surface modes has been reported before by in K. Saitoh et al., *Air-core photonic band-gap fibers: the impact of surface modes*, which is cited above. Unlike the surface modes introduced by an air core, these modes do not result from perturbation of the photonic crystal bulk modes. Rather, the modes result from the introduction of the thin ring of high index material in air, which acts as a waveguide. If the modes were truly the modes of a ring surrounded on both sides by nothing but air, they would be slower than light; however, FIG. 23B shows that this is not the case—the dispersion curves of all these modes are above the light line. The photonic crystal on the outside of the ring speeds up these modes to above the speed of light for the same physical reasons that cause the phase velocity of the core modes to be greater than the speed of light. Note also that these surface modes introduced by the thin ring differ from the surface modes introduced by the air core alone in the sense that they do not intersect the light line within the bandgap.

Careful inspection of FIGS. 25A and 25B shows that the maxima of the surface modes are not centered exactly on the ring but are located in the air core just inside the ring. This is not the physical location of the maxima. Rather, the offset of the maxima is an artifact resulting from a limitation in the simulator. The simulator uses Fourier transforms to calculate the fiber modes and automatically smoothens the originally abrupt edges of the photonic crystal dielectric to avoid introducing unphysical oscillations in the solutions it generates. Thus, the simulator models a ring with a refractive index that gradually tapers from the index of silica down to the index of air over some distance on both sides of the ring. As a result, the modeled ring is a little thicker than the ring shown in FIGS. 25A and 25B. This offset of the maxima could be avoided in other calculations by increasing the grid resolution, which would use considerably more memory and would require a much longer computing time. This artifact however, does not affect the quantitative conclusions of these simulations. The artifact only produces an uncertainty for the actual thickness of the modeled ring, which is somewhat larger than the nominal value of 0.03 $\Lambda$ initially selected.

In certain embodiments, the dimensions of the core ring are selected to reduce losses of the photonic-bandgap fiber and the amount of coupling between the fundamental modes of the fiber and the surface modes induced by the core or by the core ring. As used herein, "core-induced surface modes" denotes modes which result from the existence of the core within the fiber, and "ring-induced surface modes" denotes modes which result from the existence of the core ring within the fiber. In certain embodiments, the dimensions of the core ring are selected to reduce the number of core-induced surface modes, the number of ring-induced surface modes, or both. In embodiments in which the core ring has an outer perimeter, an inner perimeter, and a thickness between the outer perimeter and the inner perimeter, at least one of the outer perimeter, the inner perimeter, and the thickness is selected to reduce the number of core-induced surface modes, the number of ring-induced surface modes, or both. For certain embodiments comprising a core ring having a substantially circular cross-section, at least one of the outer radius, the inner radius, and the thickness is selected to reduce the number of core-induced surface modes, the number of ring-induced surface modes, or both.

In certain embodiments, the radius of the core region (corresponding to the outer radius of the core ring) is selected to minimize the number of core-induced surface modes. As described above, by having an outer perimeter which passes only through regions of the photonic crystal lattice which do not support intensity lobes of the highest frequency bulk mode, certain embodiments described herein substantially avoid creating core-induced surface modes. Exemplary ranges or values of the outer radius of the core ring of a single-mode fiber compatible with certain such embodiments include, but are not limited to, less than 1.2 $\Lambda$, between approximately 0.9 $\Lambda$ and approximately 1.13 $\Lambda$, between approximately 0.7 $\Lambda$ and approximately 1.05 $\Lambda$, and approximately equal to 0.8 $\Lambda$. Exemplary ranges or values of the outer radius of the core ring of a multi-mode fiber compatible with certain such embodiments include, but are not limited to, between approximately 1.25 $\Lambda$ and approximately 1.4 $\Lambda$, between approximately 1.6 $\Lambda$ and approximately 2.0 $\Lambda$, between approximately 2.1 $\Lambda$ and approximately 2.2 $\Lambda$, between approximately 2.6 $\Lambda$ and approximately 2.8 $\Lambda$, and between approximately 3.3 $\Lambda$ and approximately 3.4 $\Lambda$.

In certain embodiments, the thickness of the core ring is selected to minimize the number of ring-induced surface modes. As described more fully below, thinner core rings generally support fewer ring-induced surface modes than do thicker core rings. In certain embodiments, the ring thickness is selected to be sufficiently small to support at most one ring-induced surface mode. Exemplary ranges or values of the ring thickness compatible with certain embodiments described herein include, but are not limited to, less than 0.03 $\Lambda$, less than 0.02 $\Lambda$, and less than 0.01 $\Lambda$.

A second set of simulations models the effects of adding a thin ring to an air-core fiber that already supports surface modes. To do so, the simulation uses the same fiber as before, except that the core radius is increased to $R_1=1.13$ $\Lambda$. The cross-sectional profile of this modified fiber is shown in FIG. 26A. The fiber core now cuts through corners of the dielectric lattice. As a consequence, surface modes are now present, even in the absence of a ring, as described above.

The calculated ω-k diagram of the fiber of FIG. 26A is plotted in FIG. 27A. As predicted, in addition to the two degenerate core modes, the fiber of FIG. 26A exhibits several surface modes (six in this case, two degenerate and four non-degenerate). The origin of these surface modes has been discussed above in relation to the photonic-bandgap fibers with no core rings. In short, when the air core is introduced in a photonic-crystal cladding, the core terminates the dielectric lattice abruptly all around the edges of the core. The core locally replaces dielectric material with air, and all the original bulk modes of the fiber are perturbed. The portions of the core surface that cut through the air holes in FIG. 21A can be considered to have replaced the air holes with air of the core, and thus induce a comparatively weak perturbation. See, for example, F. Ramos-Mendieta et al., *Surface electromagnetic waves in two-dimensional photonic crystals: effect of the position of the surface plane, Physical Review B*, Vol. 59, No. 23, 15 Jun. 1999, pages 15112-15120, which is hereby incorporated herein by reference. In contrast, the portions of the core surface that cut through the dielectric regions of the photonic crystal in FIG. 21A replace the dielectric material of the lattice with air of the core, and thus perturbs the bulk modes more strongly.

Whether surface modes are induced by the introduction of the core depends on the magnitude of the perturbation of the bulk modes, and the magnitude of the perturbation of the bulk modes depends on which areas of the dielectric regions are intersected by the core. As described above in relation to photonic-bandgap fibers with no core ring, if the core radius is such that the core surface only cuts through dielectric membranes, which are relatively thin, the perturbation is not strong enough to induce surface modes, but when the core surface cuts through one or more dielectric corners, the perturbation is stronger and surface modes are induced.

The foregoing description explains why surface modes are present in the fiber of FIG. 26A, but are not present in the fiber of FIG. 21A. Because the index perturbation is negative (e.g., higher index material is replaced by lower index material), the bulk modes in the ω-k diagram all shift down in the $k_z$ space from their respective unperturbed position, or equivalently the bulk modes all shift up in frequency. For a silica/air PBF, the index difference is small enough that this shift is small. Almost all perturbed bulk modes thus remain in a bulk-mode band and do not induce surface modes. The exceptions are the modes in the highest frequency bulk-mode band of the lower band. Because such modes are located just below the bandgap in the ω-k diagram, the perturbation moves such modes into the bandgap as surface modes. See, for example, F. Ramos-Mendieta et al., *Surface electromagnetic waves in two-dimensional photonic crystals: effect of the position of the surface plane*, which is cited above. These surface modes expectedly have the same symmetry as the bulk modes from which they originate, e.g., the surface modes all exhibit narrow lobes centered on dielectric corners of the lattice. See, for example, Michel J. F. Digonnet et al., *Simple geometric criterion to predict the existence of surface modes in air-core photonic-bandgap fibers*, which is cited above. This is true of all the surface modes of FIG. 27A. Parenthetically, the dispersion curves of the surface modes all cross the light line within the bandgap.

Figure 26B:
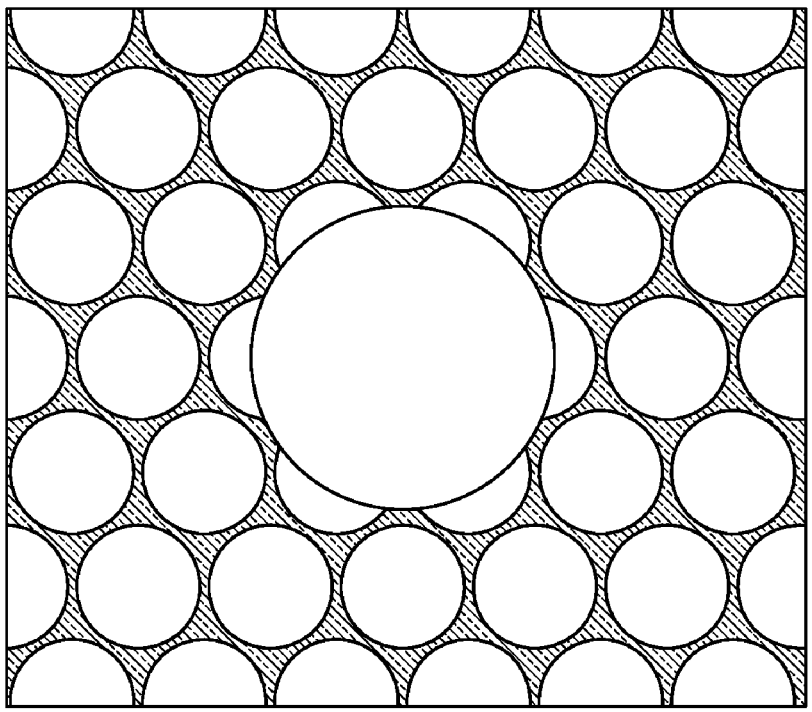
FIG. 26B illustrates a cross-section of an air-core photonic-bandgap fiber with a central air-core with a thin silica ring around the core, the air-core also having a radius R=1.13 $\Lambda$.
Figure 26A:
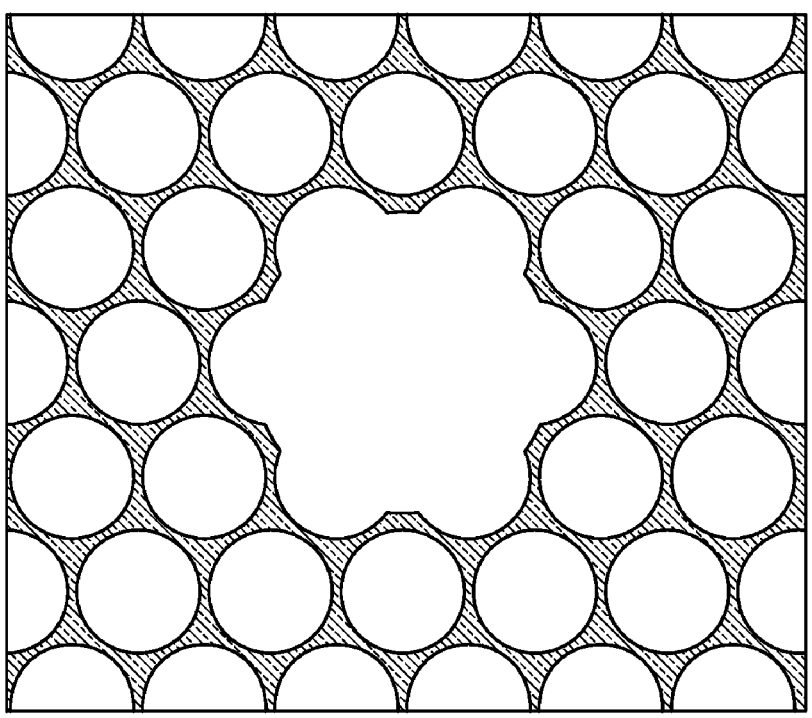
FIG. 26A illustrates a cross-section of an air-core photonic-bandgap fiber with a central air-core with no ring around the core, the air-core having a radius R=1.13 $\Lambda$, such that the core supports surface modes.
Figure 27B:
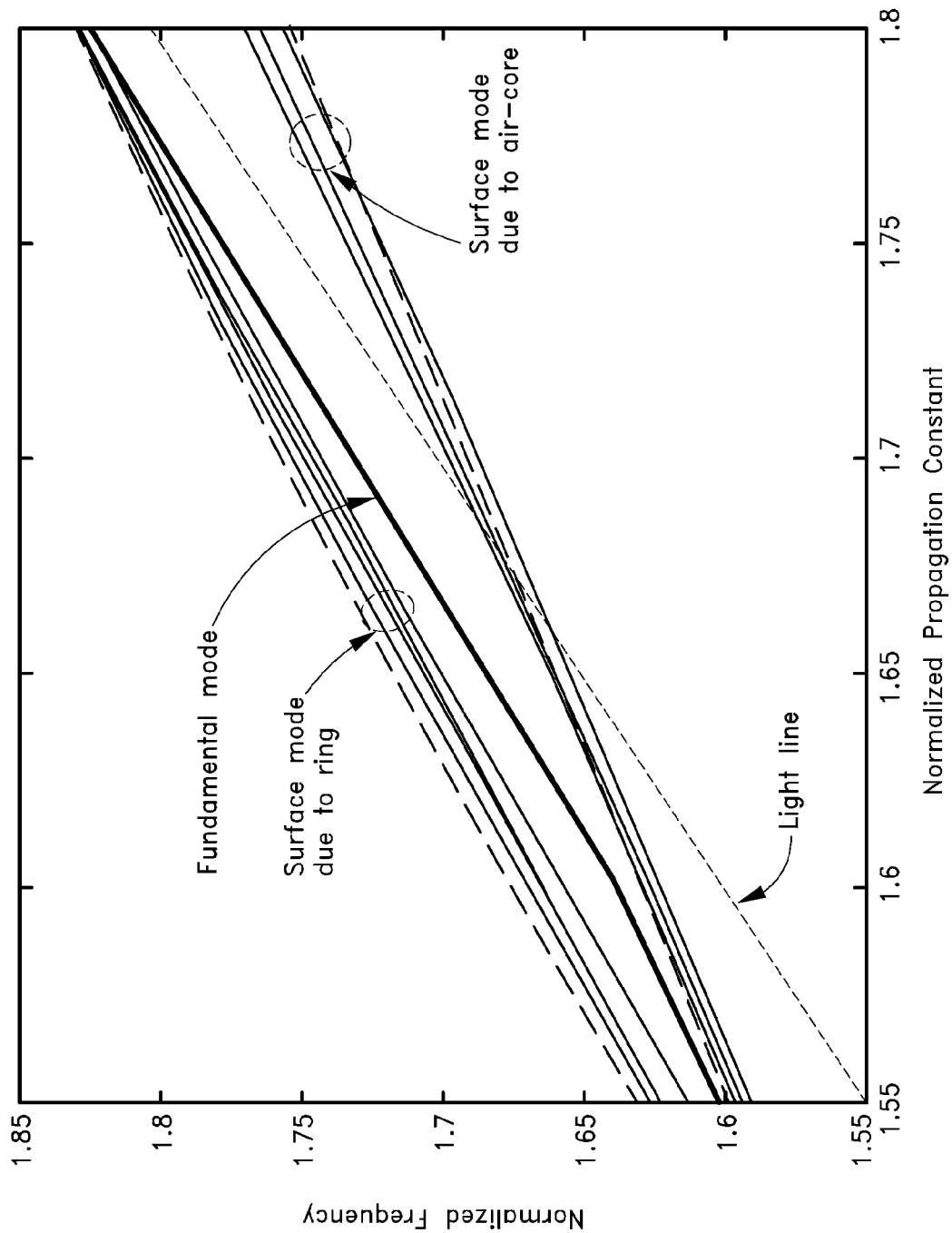
FIG. 27B illustrates a calculated $\omega$-k diagram of the air-core fiber having a thin silica ring around the core of FIG. 26B.

When a thin silica ring is added around the core of this fiber as shown in FIG. 26B, the ω-k diagram evolves to the new diagram shown in FIG. 27B. Again, the two nearly degenerate fundamental modes are slightly slowed down. Thus, the fundamental modes are shifted down in frequency. For the same physical reasons, the six pre-existing surface modes are also frequency down-shifted. This shift is larger for the surface modes than for the fundamental modes, which means that the surface modes are pushed away from the fundamental modes. Thus, in certain embodiments, the introduction of a thin core ring advantageously decreases the coupling efficiency of pre-existing surface modes to the fundamental modes, which in turn decreases the fiber loss.

In certain embodiments, the addition of the thin ring also introduces a new group of surface modes, as can be seen in FIG. 27B, which deteriorates the fiber loss. These surface modes (two degenerate and three non-degenerate, as before) are once again supported by the open segments of the ring and are sped up by the presence of the photonic crystal. As expected, the profiles of the introduced surface modes in FIG. 27B are qualitatively similar to the profiles of the surface modes introduced by a ring in an air-core fiber that did not originally support surface modes, as shown, for example, in FIGS. 25A and 25B.

Since the addition of a ring replaces air by dielectric material (e.g., silica) in the air core, the perturbation introduced by the ring has the opposite sign as when the air core alone is introduced. The index perturbation is now negative (e.g., lower index material is replaced by higher index material), and in the ω-k diagram, all the bulk modes shift down in frequency. In embodiments in which this perturbation is sufficiently large, the lowest frequency bulk modes of the upper band shift down into the bandgap and shed surface modes. This result is the mirror image of what happens when an air core alone is introduced in the PBF, in which case the index perturbation is positive and the highest frequency bulk modes of the lower band move into the bandgap as surface modes. In the ω-k diagram, the dispersion curves of the surface modes shed by the upper-band modes are located just below the upper band from which they originate, e.g., in the same general location as the ring-supported surface modes shown in FIG. 27B. However, such surface modes would also have the symmetry of upper-band bulk modes, e.g., their maxima would be on the membranes of the photonic crystal lattice. Because none of the surface modes in FIG. 27B exhibit the expected symmetry, in certain such embodiments, the ring is thin enough that the perturbation it introduces on the lattice is too weak to generate surface modes from the upper band.

Corning researchers have provided experimental evidence of the presence of surface modes in some of their air-core fibers. See, for example, Dirk Müller et al., *Measurement of Photonic Band-gap Fiber Transmission from 1.0 to 3.0 μm and Impact of Surface Mode Coupling*, which is cited above. For a fiber having a thin hexagonal ring around the core, the Corning researchers measured a strong attenuation peak located around 1600 nanometers, roughly in the middle of the fiber transmission spectrum. They inferred through simulations that this peak was due to a small number of surface modes that happen to cross the dispersion curve of the fundamental mode around 1600 nanometers. In this spectral region, coupling between the core mode and these surface modes was therefore resonant, which resulted in the attenuation peak observed by the researchers.

Using the published cross-sectional profile of the foregoing Corning fiber as input to the simulation code, simulations similar to those described herein confirmed the findings of the Corning researchers. In addition, these simulations showed that these resonant surface modes have maxima centered on the open segments of the hexagonal core ring of the fiber, which implies that the surface modes are again entirely supported by the ring.

Some experimental air-core PBFs with a ring around the core exhibit a spurious mid-band attenuation peak, as described for example, in the above-cited Dirk Müller et al., *Measurement of Photonic Band-gap Fiber Transmission from 1.0 to 3.0 μm and Impact of Surface Mode Coupling*, and B. J. Mangan et al., *Low loss (1.7 dB/km) hollow core photonic bandgap fiber*, which are cited above. Other experimental air-core PBFs do not exhibit this peak. See, for example, Theis P. Hansen et al., *Air-Guiding Photonic Bandgap Fibers: Spectral Properties, Macrobending Loss, and Practical Handling*, which is cited above, and *HC-1550-02 Hollow Core Photonic Bandgap Fiber*, blazephotonics.com, pages 1-4; which is hereby incorporated herein by reference. These differences indicate that particular combinations of ring and crystal geometries move the surface modes into the middle of the band while other combinations do not. Thus, in certain embodiments, the ring and crystal geometries are advantageously designed to reduce or avoid the surface modes within the band.

In certain embodiments, even if the core radius of a ring-less PBF is selected to avoid the surface modes shed by the lower-band bulk modes, as described above in relation to photonic-bandgap fibers with no core ring, surface modes are still likely to be present once a ring is introduced. Because these surface modes have high electric fields in the dielectric ring, these surface modes are expected to be lossy, like other surface modes. Furthermore, because the fundamental core mode has relatively large fields on the open segments of the ring, shown in FIG. 24B, the overlap of the core mode with the surface modes supported by the ring is larger than in a ring-less fiber. Thus, in certain embodiments, coupling from the core mode to these surface modes is predicted to be larger than in a ring-less fiber, which means that these surface modes likely introduce a substantial loss and are thus undesirable. This view is fully supported by the simulations and experimental observations regarding Corning's fiber discussed above.

The loss induced by ring surface modes can be alleviated in various ways. In certain embodiments, fibers are fabricated without a core ring, as described above. In certain such embodiments, the fiber carries a single mode and no surface modes across the entire bandgap.

In certain other embodiments, one or more of the outer ring radius, the inner ring radius, and the ring thickness are selected to reduce losses of the PBF. Certain such embodiments advantageously reduce the amount of fiber loss as compared to other configurations by reducing the number of ring-induced surface modes, reducing the coupling between the ring-induced surface modes and the fundamental mode (e.g., by moving the ring-induced surface modes away from the fundamental mode in the ωk diagram), or both.

In certain embodiments, the core ring of the photonic-bandgap fiber surrounds the core and has an outer perimeter which passes through regions of the photonic crystal lattice which support intensity lobes of the highest frequency bulk mode. In certain other embodiments, the core ring surrounds the core and has an outer perimeter which passes through one or more of the inscribed circles enclosed by a portion of the lattice material and having a circumference tangential to three adjacent holes.

FIG. 26B illustrates an exemplary embodiment in which the core ring has a substantially circular cross-section, an inner perimeter generally parallel to the outer perimeter, and a thickness between the inner perimeter and the outer perimeter. Other shapes of the core ring (e.g., non-circular cross-sections, non-parallel inner and outer perimeters) are also compatible with embodiments described herein. In addition, while the fiber lattice of FIG. 26B has a triangular pattern of holes with substantially circular cross-sections, other patterns and shapes of holes are also compatible with embodiments described herein.

As described above, for a constant ring thickness (e.g., 0.03 Λ), when the ring radius (e.g., an outer ring radius) is increased from 0.9 Λ to 1.13 Λ the number of ring surface modes remains unchanged (five in both cases). Thus, over the range of core radii for which the fiber is single-moded (R<~1.2 Λ), the number of surface modes remains constant. However, increasing the ring radius from 0.9 Λ to 1.13 Λ shifts the dispersion curve of the ring surface modes up in frequency, e.g., away from the dispersion curve of the fundamental mode, as can be seen by comparing FIG. 23B and FIG. 27B. In certain embodiments, the outer radius of the core ring is sufficiently large to shift the dispersion curves of the ring-induced surface modes away from the dispersion curve of the fundamental mode of the fiber. Using a large core radius in certain embodiments therefore advantageously increases the detuning between the fundamental and surface modes, and thus weakens the coupling between the fundamental mode and the surface modes and lowers the fiber loss. In certain embodiments, the outer radius of the core ring is selected to induce ring surface modes having dispersion curves which are substantially decoupled from the fundamental mode dispersion curve of the fiber.

For a fixed ring radius (R=0.9 Λ), the number of ring surface modes increases with increasing ring thickness, e.g., from five modes for thicknesses of 0.03 Λ and 0.06 Λ to ten modes for a thickness of 0.09 Λ. In certain embodiments, the core ring has a thickness selected to be sufficiently small to support at most one ring-induced surface mode. Using a thinner ring in certain embodiments therefore advantageously reduces the number of surface modes, and thus reduces the fiber loss. Accurate modeling of PBFs with a ring substantially thinner than 0.03 Λ would typically utilize a much lower grid resolution (e.g., <Λ/16) than that used in the simulations discussed herein, with a corresponding increase of computation time and memory requirements.

Figure 28:
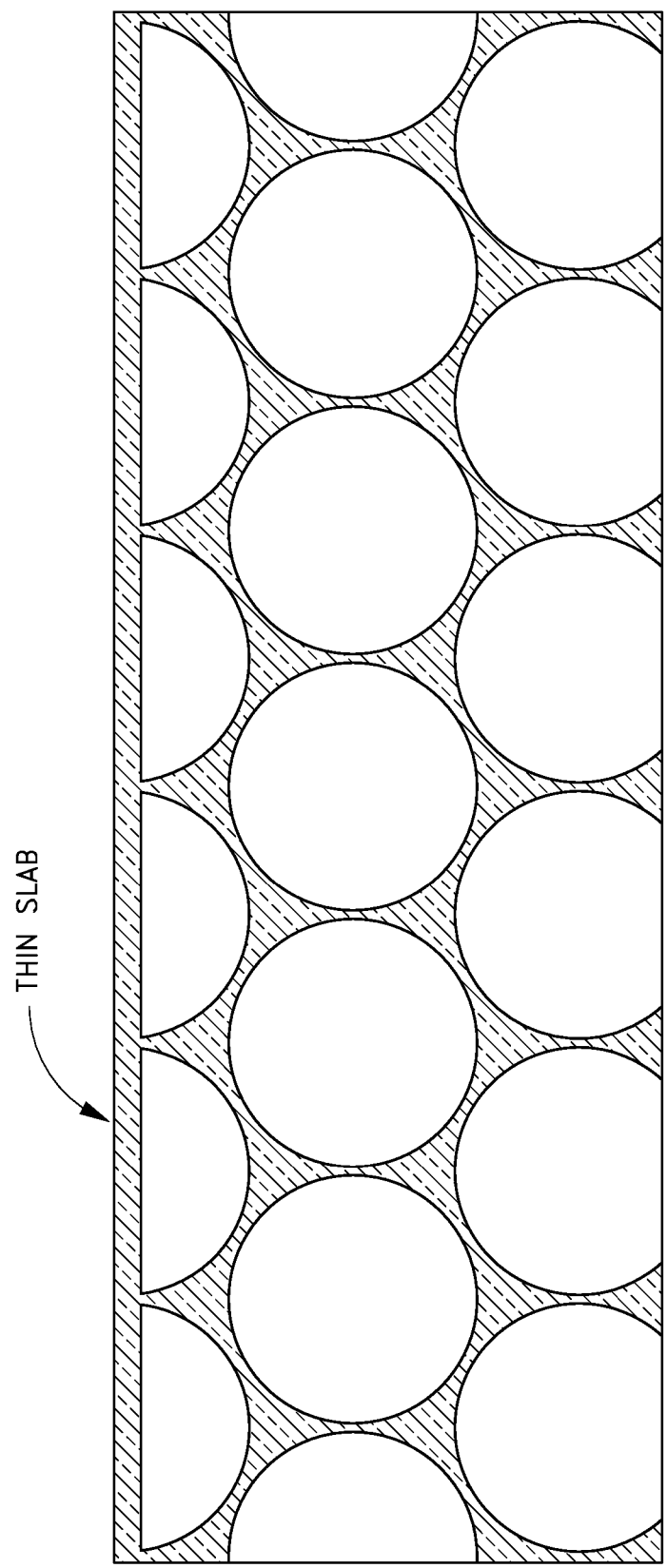
FIG. 28 illustrates a cross section of a photonic crystal terminated by a thin slab for modeling a very thin PBF core ring.

FIG. 28 illustrates an alternative photonic crystal (PC) structure which is terminated across its membranes by an infinite thin plane slab, and which is used to model a PBF. The PC has the same triangular hole pattern in silica and has the same air hole radius (ρ=0.47 Λ) as the PBF configurations discussed above. The advantage of using the photonic crystal of FIG. 28 rather than a fiber structure is that the PC symmetry allows a much smaller supercell size to be used. For example, a 1×16√3 supercell size can be used in this case instead of a 10×10 supercell size. Consequently, for a given computation time, the grid resolution can be much smaller (~Λ/64).

Simulations using the PC configuration of FIG. 28 show that the thin slab supports surface modes centered on the open segments of the slab, as expected. The number of slab surface modes was found to decrease with decreasing slab thickness. As the slab thickness is reduced towards zero (0.001 Λ is the lowest value modeled), the number of surface modes supported by the slab may drop to zero or to a non-zero asymptotic value. In addition, the surface mode shifts into the bandgap as the ring thickness is reduced. In certain embodiments, the ring can support surface modes even for vanishingly small thicknesses.

Various embodiments have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A photonic-bandgap optical fiber comprising:
   a core region; and
   a core ring having an inner perimeter, an outer perimeter, and a thickness between the inner perimeter and the outer perimeter, the core ring surrounding the core region, wherein the thickness is sized to reduce the number of ring surface modes supported by the core ring.

2. The optical fiber of claim 1, wherein the inner perimeter is generally parallel to the outer perimeter.

3. The optical fiber of claim 1, wherein the inner perimeter is not parallel to the outer perimeter.

4. The optical fiber of claim 1, further comprising a cladding comprising a material having a first refractive index and a pattern of regions formed therein, the regions having a second refractive index lower than the first refractive index.

5. The optical fiber of claim 4, wherein the core ring comprises the material.

6. The optical fiber of claim 4, wherein the pattern of regions comprises a plurality of geometric regions, each geometric region having a cross-section with a respective center and adjacent geometric regions being spaced apart by a center-to-center distance Λ.

7. The optical fiber of claim 6, wherein the core ring has a thickness less than approximately 0.03 Λ.

8. The optical fiber of claim 6, wherein the core ring has a substantially circular cross-section with an outer radius less than 1.2 Λ.

9. The optical fiber of claim 6, wherein the core ring has a substantially circular cross-section with an outer radius between approximately 1.25 Λ and approximately 1.4 Λ.

10. The optical fiber of claim 6, wherein the core ring has a substantially circular cross-section with an outer radius between approximately 1.6 Λ and approximately 2.0 Λ.

11. The optical fiber of claim 6, wherein each geometric region has a substantially circular cross-section with a radius ρ which is less than 0.5 Λ.

12. The optical fiber of claim 4, wherein the optical fiber is a single-mode fiber.

13. The optical fiber of claim 4, wherein the optical fiber is a multi-mode fiber.

14. The optical fiber of claim 4, wherein the material comprises silica.

15. The optical fiber of claim 4, wherein the regions contain air.

16. The optical fiber of claim 1, wherein the core region is hollow.

17. The optical fiber of claim 1, wherein the core ring is substantially circular.

18. The optical fiber of claim 1, wherein the core region contains air.

19. The optical fiber of claim 1, wherein the core ring induces ring surface modes having dispersion curves substantially decoupled from a fundamental mode dispersion curve of the optical fiber.

20. A photonic-bandgap optical fiber comprising:
  a cladding comprising a material having a first refractive index and a pattern of regions formed therein, the regions having a second refractive index lower than the first refractive index, a first portion of the cladding supporting intensity lobes of the highest frequency bulk mode and a second portion of the cladding not supporting intensity lobes of the highest frequency bulk mode; and
  a core region surrounded by the cladding; and
  a core ring surrounding the core region and surrounded by the cladding, the core ring having an inner edge, an outer edge, and a thickness between the inner edge and the outer edge, wherein the thickness is sized to reduce the number of ring surface modes supported by the core ring.

21. The optical fiber of claim 20, wherein the outer edge passes through the second portion of the cladding and does not pass through the first portion of the cladding.

22. A method of propagating light signals, the method comprising:
  providing a photonic-bandgap optical fiber comprising a material with a pattern of regions formed therein to form a cladding surrounding a core region, the material having a first refractive index and the pattern of regions having a second refractive index lower than the first refractive index, the optical fiber further comprising a core ring surrounding the core region and having an outer radius, an inner radius, and a thickness between the outer radius and the inner radius, wherein the thickness is sized to reduce the number of ring surface modes supported by the core ring; and
  propagating light through the optical fiber.

23. A method of designing a photonic-bandgap optical fiber comprising a core region and a cladding, the method comprising designing a substantially circular core ring surrounding the core region and having an outer radius, an inner radius, and a thickness between the outer radius and the inner radius, at least one of the outer radius, the inner radius, and the thickness selected to reduce the number of ring-induced surface modes.

24. A method of making a photonic-bandgap optical fiber, the optical fiber comprising a material having a first refractive index and a pattern of regions formed therein, the regions having a second refractive index lower than the first refractive index, the method comprising:
  determining intensity profiles of a highest frequency bulk mode proximate to the regions; and
  forming a core region surrounded by the material, the core region having an edge that intersects the regions at locations where the intensities of the highest frequency bulk mode are low enough that the optical fiber does not support surface modes.

* * * * *

UNITED STATES PATENT AND TRADEMARK OFFICE
CERTIFICATE OF CORRECTION

PATENT NO. : 7,489,848 B2  Page 1 of 1
APPLICATION NO. : 11/971181
DATED : February 10, 2009
INVENTOR(S) : Hyang Kyun Kim et al.

It is certified that error appears in the above-identified patent and that said Letters Patent is hereby corrected as shown below:

At column 3, line 28, change "(13 d/km)" to --(13 dB/km)--, therefor.

A column 8, line 41, change " $a = \left(\Lambda / \sqrt{3}\right) - \rho$ " to -- $\alpha = \left(\Lambda / \sqrt{3}\right) - \rho$ --, therefor.

At column 27, line 9, change "ωk" to --ω-k--, therefor.

Signed and Sealed this

Twenty-first Day of July, 2009

JOHN DOLL
*Acting Director of the United States Patent and Trademark Office*